United States Patent [19]
Traxlmayr

[11] Patent Number: 6,055,358
[45] Date of Patent: Apr. 25, 2000

[54] APPARATUS FOR RECORDING AND REPRODUCING VIDEO AND AUDIO SIGNALS IN EITHER ANALOG OR DIGITAL FORM

[75] Inventor: Ulrich Traxlmayr, Laxenburg, Austria

[73] Assignee: U.S. Philips Corporation, New York, N.Y.

[21] Appl. No.: 09/329,028

[22] Filed: Jun. 9, 1999

Related U.S. Application Data

[62] Division of application No. 08/975,876, Nov. 21, 1997, Pat. No. 5,937,137, which is a continuation of application No. 08/512,857, Aug. 9, 1995, abandoned.

[30] Foreign Application Priority Data

Aug. 9, 1994 [AT] Austria ..................................... 1555/94
Oct. 19, 1994 [AT] Austria ..................................... 1971/94

[51] Int. Cl.[7] .................................................. H04N 5/782
[52] U.S. Cl. ............................................ 386/96; 386/104
[58] Field of Search ................................ 386/46, 67, 96, 386/104, 112, 124, 68, 72, 74, 75, 81, 92, 95; 360/64; H04N 5/782, 5/76

[56] References Cited

U.S. PATENT DOCUMENTS

| | | | |
|---|---|---|---|
| 5,335,125 | 8/1994 | Nakatsu et al. | 386/67 |
| 5,381,280 | 1/1995 | Lee | 360/75 |
| 5,412,515 | 5/1995 | Rijckaert et al. | 368/48 |
| 5,519,544 | 5/1996 | Hara | 386/96 |

FOREIGN PATENT DOCUMENTS

| | | |
|---|---|---|
| 346973B1 | 2/1994 | European Pat. Off. . |
| 601963 A2 | 6/1994 | European Pat. Off. . |
| 63-298865 | 12/1988 | Japan . |

Primary Examiner—Huy Nguyen
Attorney, Agent, or Firm—Edward W. Goodman

[57] ABSTRACT

An apparatus for recording and reproducing video and audio signals in either analog or digital form. The heads are arranged to conform with existing analog standards, such as VHS, and yet are also able to record in digital form in adjacent non-overlapping tracks. In a preferred embodiment, one pair of heads is arranged with a small azimuth angle (+/−6 degrees), and another pair is arranged with a larger second azimuth angle (+/−30 degrees), conforming to the VHS standard, but the head width and location are modified compared to the standard such as to allow recording and reproducing both VHS as well as digital tapes.

3 Claims, 7 Drawing Sheets

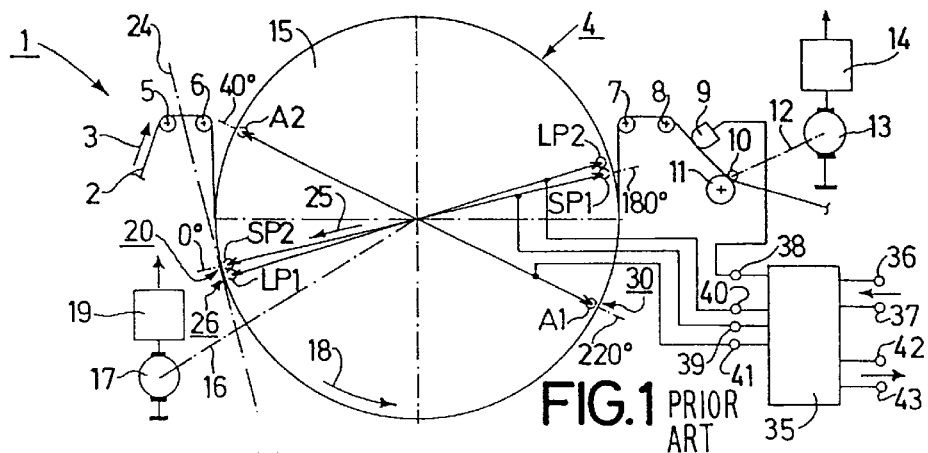
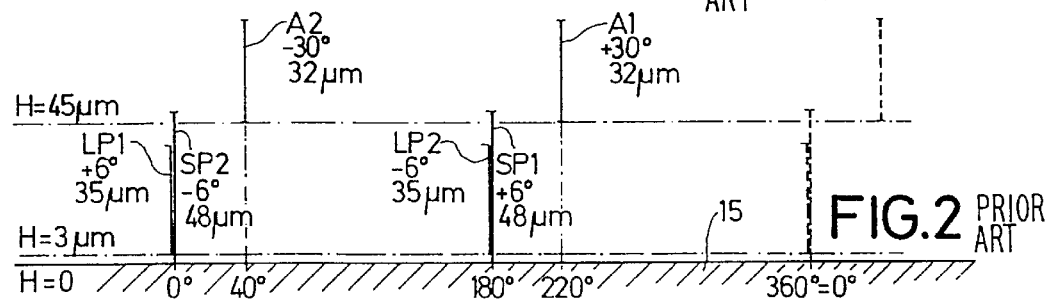
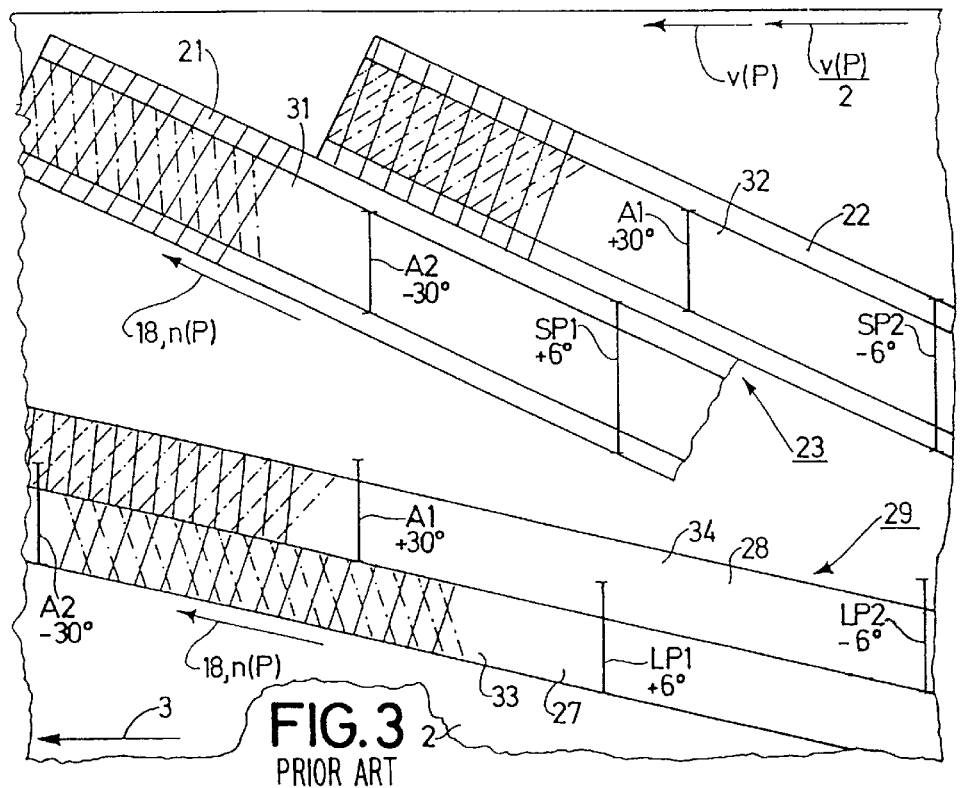

APPARATUS FOR RECORDING AND REPRODUCING VIDEO AND AUDIO SIGNALS IN EITHER ANALOG OR DIGITAL FORM

CROSS-REFERENCE TO RELATED APPLICATIONS

This is a divisional of U.S. patent application Ser. No. 08/975,876, filed Nov. 21, 1997 U.S. Pat. No. 5,937,137, which is a continuation of application Ser. No. 08/512,857, filed Aug. 9, 1995, now abandoned.

BACKGROUND OF THE INVENTION

1. Field of the Invention

The invention relates to an apparatus for recording and reproducing video signals and audio signals on and from a magnetic tape in adjacent tracks which are inclined relative to the longitudinal direction of the tape, the apparatus comprising a drum-shaped scanning device around which the magnetic tape is wrapped along a helical path during recording and reproduction and which comprises a rotationally drivable head support for carrying a plurality of magnetic heads, the head support carrying one head pair for the transmission of analog video signals at at least one given tape speed, this one head pair comprising two diagonally arranged magnetic heads having head gaps with oppositely oriented azimuth angles for scanning the magnetic tape along adjacent inclined tracks, and at least one further head pair for the transmission of analog audio signals at at least one given tape speed, this further head pair comprising two diagonally arranged magnetic heads having head gaps with oppositely oriented further azimuth angles for scanning the magnetic tape along further adjacent inclined tracks, the azimuth angles of the two magnetic heads of the one head pair being smaller than the further azimuth angles of the two magnetic heads of the further head pair, the apparatus further comprising a signal processing device for processing analog video signals and analog audio signals, this signal processing device being connected to the respective magnetic heads during the transmission of analog video signals and analog audio signals.

The invention also relates to an apparatus for recording and/or reproducing video signals and audio signals on/from a magnetic tape in adjacent tracks which are inclined relative to the longitudinal direction of the tape, the apparatus comprising a drum-shaped scanning device around which the magnetic tape is wrapped along a helical path during the recording and reproduction of signals and which comprises a rotationally drivable head support for carrying a plurality of magnetic heads, the head support carrying one head pair for the transmission of information signals at at least one given tape speed, this one head pair comprising two diagonally arranged magnetic heads having head gaps with oppositely oriented azimuth angles for scanning the magnetic tape along adjacent inclined tracks, and at least one further head pair for the transmission of further information signals at at least one given tape speed, this further head pair comprising two diagonally arranged magnetic heads having head gaps with oppositely oriented further azimuth angles for scanning the magnetic tape along further adjacent inclined tracks, the azimuth angles of the two magnetic heads of the one head pair being smaller than the further azimuth angles of the two magnetic heads of the further head pair, the apparatus further comprising a signal processing device for processing the information signals and the further information signals, this signal processing device being connected to the respective magnetic heads during the transmission of information signals and further information signals.

The invention further relates to a magnetic tape for cooperation with an apparatus of the type defined in the first paragraph, and with an apparatus of the type defined in the second paragraph, this tape having been provided with adjacent tracks which are inclined relative to the longitudinal direction of the tape.

2. Description of the Related Art

An apparatus of the type defined in the first and second paragraphs has been marketed by, for example, Philips Electronics under the type designation VR 632, and is known therefrom. This known apparatus is a video recorder in accordance with the VHS standard for analog video signals in accordance with a PAL television standard. In this video recorder, the head support of the drum-shaped scanning device carries a first head pair comprising two diagonally disposed magnetic heads having head gaps with comparatively small oppositely oriented first azimuth angles of approximately +6° an −6°, a second head pair comprising two diagonally disposed magnetic heads having head gaps also with comparatively small oppositely oriented second azimuth angles of approximately +6° an −6°, and a further head pair comprising two diagonally disposed magnetic heads having head gaps with comparatively large oppositely oriented further azimuth angles of approximately +30° an −30°. With the known video recorder, it is possible to record and reproduce analog PAL video signals by means of the magnetic heads of the first head pair in comparatively wide first inclined tracks having a track width of approximately 48 μm while the magnetic tape is driven at a normal tape speed in a so-called Short-Play mode, to record and reproduce analog PAL video signals by means of the magnetic heads of the second head pair in comparatively narrow second inclined tracks having a track width of approximately 24 μm while the magnetic tape is driven at a reduced tape speed in a so-called Long-Play mode, and to record and reproduce analog frequency-modulated audio signals both in the Short-Play mode and in the Long-Play mode by means of the magnetic heads of the further head pair in comparatively narrow further inclined tracks having a track width of approximately 32 μm in the Short-Play mode and of approximately 24 μm in the Long-Play mode. During recording both in the Short-Play mode and in the Long-Play mode, the analog frequency-modulated audio signals are first recorded in the comparatively narrow further inclined tracks, recording being effected down to deeper lying areas of the magnetic tape, and after this, the analog PAL video signals are recorded on the magnetic tape in the comparatively wide first inclined tracks and in the comparatively narrow second inclined tracks, which is effected in less deep areas of the magnetic tape.

As a result of the arrangement of the magnetic heads on the head support of the drum-shaped scanning device, the recording of analog video signals and analog frequency-modulated audio signals in the known apparatus is effected in such a manner that the comparatively narrow further inclined tracks, which are scanned by the magnetic heads of the further head pair in the Short-Play mode and in which the analog audio signals are recorded, are wholly overlapped by the comparatively wide first inclined tracks, which are scanned by the magnetic heads of the first head pair in the Short-Play mode and in which the analog video signals are recorded, and that the comparatively narrow further inclined tracks, which are scanned by the magnetic heads of the further head pair in the Long-Play mode and in which the analog frequency-modulated audio signals are recorded, are, in essence, also overlapped by the comparatively narrow second inclined tracks, which are scanned by the magnetic heads of the second head pair in the Long-Play mode and in which the analog video signals are recorded. Expressed in other words, this means that in the known apparatus, not only the magnetic heads of the further head pair and the magnetic heads of the first head pair scan mutually overlapping inclined tracks in the Short-Play mode but also the magnetic heads of the further head pair and the magnetic heads of the second head pair scan mutually overlapping inclined tracks in the Long-Play mode. This imposes the restriction that the known apparatus is only capable of recording and reproducing analog video signals and analog audio signals as explained above.

As already stated, an apparatus of the type defined in the first and second paragraphs has been marketed by Philips Electronics under the type designation VR 632, and is known therefrom. The construction of this known apparatus has already been explained above. It is to be noted merely that this known apparatus is only capable of recording, and hence, storing and reproducing information signals in the form of analog PAL video signals and further information signals in the form of analog frequency-modulated audio signals on/from a magnetic tape.

A magnetic tape of the type defined in the third paragraph is also generally known, for example, from the magnetic-tape-cassettes in accordance with the VHS standard which are currently marketed worldwide.

SUMMARY OF THE INVENTION

It is an object of the invention to remove the above-mentioned restriction of an apparatus of the type defined in the first paragraph and to improve such an apparatus of the type defined in the first paragraph in such a manner that, in addition to the transmission of analog video signals and analog audio signals, such an apparatus is also capable of recording and reproducing digital video signals and the associated digital audio signals using the same number of magnetic heads. According to the invention, this object is achieved in that the magnetic heads of the one head pair and the magnetic heads of the further head pair are arranged on the head support in such a relationship to one another that the magnetic heads of the one head pair and the magnetic heads of the further head pair scan adjacent interleaved inclined tracks at a given tape speed, in such a manner that, each time, an inclined track scanned by a magnetic head of one of these two head pairs is situated between two of the inclined tracks scanned by the magnetic heads of the other one of these two head pairs, and in that the gap lengths of the head gaps of the magnetic heads of the one head pair and of the further head pair are, at most, 0.40 $\mu$m, and in that the apparatus comprises a signal processing device for processing digital video signals and digital audio signals, this signal processing device being connected to the magnetic heads of the one head pair and of the further head pair during the recording and reproduction of such digital video signals and digital audio signals.

In this way it is achieved that in an apparatus in accordance with the invention, while the magnetic tape is being driven with the given tape speed, the magnetic heads of the one head pair and the magnetic heads of the further head pair now scan four adjacent non-overlapping inclined tracks during each revolution of the head support. These four inclined tracks scanned by the four magnetic heads of both head pairs during each revolution provide an adequate storage capacity to allow a digital video signal and an associated digital audio signal to be stored with satisfactory quality. Since the gap lengths of the head gaps of the four magnetic heads of the two head pairs do not exceed 0.40 $\mu$m, this advantageously guarantees a faultless and good-quality recording and reproduction of digital video signals and digital audio signals. An apparatus in accordance with the invention has the advantage that it invariably enables analog video signals to be recorded in and reproduced from inclined tracks while the magnetic tape is driven at the given tape speed. Only the possibility of recording analog audio signals in inclined tracks is no longer available due to the small gap lengths of the magnetic heads of the further head pair, but this is not a meaningful restriction because, at any rate, a high-quality audio signal recording is guaranteed by the recording of digital audio signals in inclined tracks and, moreover, such apparatuses always also have provisions for the recording and reproduction of analog audio signals in/from a longitudinal audio track by means of a stationary magnetic audio head. In spite of the small gap lengths of the magnetic heads of the further head pair, an apparatus in accordance with the invention invariably enables analog audio signals to be reproduced from inclined tracks. Thus, an apparatus in accordance with the invention enables analog video signals to be recorded in and reproduced from inclined tracks and analog audio signals to be reproduced from inclined tracks and, in addition, enables digital video signals and digital audio signals to be recorded in and reproduced from inclined tracks without the number of magnetic heads being increased in comparison with a known apparatus which is only capable of recording analog video signals and analog audio signals in and reproducing them from inclined tracks.

It is to be noted that the German Patent Specification DE 35 10 766 C2 discloses a video recorder which is suitable for recording and reproducing analog video signals and digital video signals in adjacent inclined tracks, but this known video recorder is not suited for reproducing audio signals from such inclined tracks because the rotationally drivable head support of this known video recorder does not carry any magnetic heads for the transmission of audio signals, whereas an apparatus in accordance with the invention is definitely suitable for this, in that the magnetic heads provided on the rotationally drivable head support for the reproduction of analog audio signals are also utilized for recording and reproducing digital video signals and digital audio signals, which are transmitted in mutually interleaved form. Furthermore, in the video recorder known from the German Patent Specification DE 35 10 766 C2, the analog video signals are recorded and reproduced in/from each inclined track by means of a head pair which scans each time one inclined track and whose magnetic heads scan one track half each. However, the head gaps of the two magnetic heads should then be aligned very exactly because, otherwise, excessive signal attenuations and even signal dropouts may occur during reproduction of the analog video signals. Such an exact alignment of the head gaps, however, is very difficulty and is therefore intricate and expensive. An apparatus in accordance with the invention does not have these problems.

It is to be noted also that a digital video recorder system for recording and reproducing digital video signals and digital audio signals has been proposed, in which two pairs of magnetic heads arranged on a rotationally drivable head support scan four adjacent inclined tracks during one revolution of the head support. Each pair of magnetic heads then comprises one magnetic head having a head gap with a comparatively large azimuth angle of +20° and one magnetic head having a head gap with a comparatively large azimuth angle of −20°, the four magnetic heads of the two pairs of magnetic heads being arranged on the head support in such a relationship relative to one another that these four magnetic heads scan a track pattern of mutually interleaved inclined tracks, in which an inclined track to be scanned with a magnetic head having a head gap with an azimuth angle of −20° (or +20°) is situated between two inclined tracks to be scanned with a magnetic head having a head gap with an azimuth angle of +20 (and −20°, respectively). However, this known video recorder system enables exclusively digital video signals and digital audio signals to be recorded in inclined tracks and to be reproduced from these inclined tracks, whereas an additional transmission of analog video signals and analog audio signals from only two inclined track during each revolution of the magnetic heads by means of the same magnetic heads with which the digital video signals and digital audio signals are recorded and reproduced is not possible with the proposed known video recorder system, without at least losing one of the well-known advantages of analog video signal recording systems, such as the VHS system, i.e., the advantages of the so-called azimuth damping and of the continuous signal flow without the use of signal buffers. Thus, the special advantages of an apparatus in accordance with the invention are not obtained or attainable with the known video recorder system. The apparatus described in U.S. Pat. No. 5,412,515, corresponding to European Patent Specification EP-0,346,973 B1, also relates to the same field as the known video recorder system.

Moreover, it is to be noted that European Patent Application EP-0,601,963 A2 discloses a system for recording and reproducing analog video and audio signals as well as digital video and audio signals. However, in this known system, recording and reproduction of the digital signals, i.e., the digital video and audio signals in interleaved form, is effected only with the magnetic heads provided for the recording and reproduction of these digital signals, for which reason it is necessary, in order to obtain a satisfactory transmission bandwidth, that during the recording and reproduction of digital signals, the magnetic heads are operated with a speed of rotation which is twice as high as that during the recording and reproduction of analog signals. Conversely, in an apparatus in accordance with the invention, apart from the magnetic heads provided for the recording and reproduction of analog video signals, the magnetic heads provided for the transmission of analog audio signals are additionally used for the recording and reproduction of digital video and audio signals, as a result of which the number tracks scanned per revolution of the magnetic heads is doubled and, consequently, the advantage is obtained that the speed of rotation of the magnetic heads during the recording and reproduction of digital video and audio signals need not be doubled in comparison with the speed of rotation of the magnetic heads during the recording and reproduction of analog video and audio signals. Moreover, European Patent Application EP-0,601,963 A2 does not give any details about the positioning of the rotationally drivable magnetic heads on a head support and the values of the gap lengths of the rotationally drivable magnetic heads.

In an apparatus in accordance with the invention, it has proven to be advantageous if the magnetic heads of the one head pair and the magnetic heads of the further head pair are arranged on the head support in such a relationship to one another that, at the given tape speed, a magnetic head with a positive azimuth angle of the one head pair scans a track which, viewed in the tape transport direction, follows a track scanned by a magnetic head with a positive azimuth angle of the further head pair. Thus, it is achieved that there is only a slight difference between the relative position of the magnetic heads of the one head pair and the magnetic heads of the further head pair with respect to one another in an apparatus in accordance with the invention, and the relative position of the magnetic heads of the one head pair and the magnetic heads of the further head pair with respect to one another in a known apparatus in accordance with the VHS standard, so that a drum-shaped scanning device for an apparatus in accordance with the invention can be manufactured in the same way as the drum-shaped scanning device of a known apparatus in accordance with the VHS standard and, consequently, the same production technology can be used.

In an apparatus in accordance with the invention, it has proven to be advantageous if the gap lengths of the head gaps of the magnetic heads of the one head pair and of the further head pair are 0.30 $\mu$m, at most. This is advantageous in view of a maximal bandwidth for the transmission of digital signals by means of these magnetic heads.

In an apparatus in accordance with the invention, in which the head support carries a first head pair for the transmission of analog video signals at a normal tape speed, this first head pair comprising two diagonally arranged magnetic heads having head gaps with oppositely oriented first azimuth angles for scanning the magnetic tape along first adjacent inclined tracks, and a second head pair for the transmission of analog video signals at a reduced tape speed, this second head pair comprising two diagonally arranged magnetic heads having head gaps with oppositely oriented second azimuth angles for scanning the magnetic tape along second adjacent inclined tracks, and which carries a further head pair for the transmission of analog audio signals at at least one of the tape speeds, this further head pair comprising two diagonally arranged magnetic heads having head gaps with oppositely oriented further azimuth angles for scanning the magnetic tape along further adjacent inclined tracks, the first azimuth angles of the two magnetic heads of the first head pair and the second azimuth angles of the two magnetic heads of the second head pair being smaller than the further azimuth angles of the two magnetic heads of the further head pair, as is known from the afore-mentioned apparatus bearing the type designation VR 632, it has also proven to be advantageous if the magnetic heads of the second head pair and the magnetic heads of the further head pair are arranged on the head support in such a relationship to one another that the magnetic heads of the second head pair and the magnetic heads of the further head pair scan adjacent interleaved inclined tracks at a given tape speed, such that, each time, an inclined track scanned by a magnetic head of one of these two head pairs is situated between two of the inclined tracks scanned by the magnetic heads of the other one of these two head pairs, and the gap lengths of the head gaps of the magnetic heads of the second head pair and of the further head pair are, at most, 0.40 $\mu$m, and the apparatus comprises a signal processing device for processing digital video signals and digital audio signals, this signal processing device being connected to the magnetic heads of the second head pair and of the further head pair during the recording and reproduction of such digital video signals and digital audio signals. This is advantageous, in particular, because in such an apparatus, several recording and reproducing possibilities for analog video signals are available, recording and reproduction of analog video signals also being possible in special-feature modes in which a magnetic tape is driven with a tape speed which differs from the normal tape speed.

In an apparatus in accordance with the invention, as defined in the preceding paragraph, it has also proven to be advantageous if the magnetic heads of the second head pair and the magnetic heads of the further head pair are arranged on the head support in such a relationship to one another that, at the given tape speed, a magnetic head with a positive azimuth angle of the second head pair scans a track which, viewed in the tape transport direction, follows a track scanned by a magnetic head with a positive azimuth angle of the further head pair. With such an apparatus in accordance with the invention, it is thus achieved that there is only a slight difference between the relative position of the magnetic heads of the second head pair and the magnetic heads of the further head pair with respect to one another in such an apparatus in accordance with the invention, and the relative position of the magnetic heads of the second head pair and the magnetic heads of the further head pair with respect to one another in a known apparatus in accordance with the VHS standard.

It has then also proven to be advantageous if the gap lengths of the head gaps of the magnetic heads of the second head pair and of the further head pair are 0.30 μm, at most. This is advantageous in view of a maximal bandwidth for the transmission of digital signals by means of these magnetic heads.

It is another object of the invention to construct an apparatus of the type defined in the second paragraph, such that digital video signals and digital audio signals can be recorded and digital video signals and digital audio signals can be reproduced in a simple manner by means which are known per se. To this end, an apparatus of the type defined in the second paragraph is characterized in that the magnetic heads of the one head pair and the magnetic heads of the further head pair are arranged on the head support in such a relationship to one another that the magnetic heads of the one head pair and the magnetic heads of the further head pair scan adjacent interleaved inclined tracks at a given tape speed, such that, each time, an inclined track scanned by a magnetic head of one of these two head pairs is situated between two of the inclined tracks scanned by the magnetic heads of the other one of these two head pairs, and in that the gap lengths of the head gaps of the magnetic heads of the one head pair and of the further head pair are, at most, 0.40 μm, and in that the apparatus comprises a signal processing device for processing digital video signals and digital audio signals, this signal processing device being connected to the magnetic heads of the one head pair and of the further head pair during the recording and reproduction of such digital video signals and digital audio signals. This is a simple way of realizing an apparatus by means of which digital video signals and digital audio signals can be recorded in inclined tracks. Moreover, this yields an apparatus which enables digital video signals and digital audio signals to be reproduced from the inclined tracks. A magnetic tape provided with a recording of digital video signals and digital audio signals in inclined tracks by means of such an apparatus in accordance with the invention can be used, for example, in an apparatus in accordance with the invention which is adapted to record and reproduce digital video signals and digital audio signals as well as to record and reproduce analog video signals and analog audio signals in inclined tracks, in order to reproduce the recorded digital video signals and digital audio signals from the inclined tracks by means of this apparatus.

In such an apparatus in accordance with the invention, it has also proven to be advantageous if the magnetic heads of the one head pair and the magnetic heads of the further head pair are arranged on the head support in such a relationship to one another that at the at least one given tape speed a magnetic head with a positive azimuth angle of the one head pair scans a track which, viewed in the tape transport direction, follows a track scanned by a magnetic head with a positive azimuth angle of the further head pair. This has the afore-mentioned advantage that also with such an apparatus in accordance with the invention, a slight difference is obtained between the relative positions of the magnetic heads in an apparatus in accordance with the invention and a known apparatus in accordance with the VHS standard.

In such an apparatus in accordance with the invention, it has also proven to be advantageous if the gap lengths of the head gaps of the magnetic heads of the one head pair and of the further head pair are 0.30 μm, at most. This has the afore-mentioned advantage that also with such an apparatus in accordance with the invention, a maximal bandwidth is obtained for the transmission of digital signals by means of these magnetic heads.

A very important variant of such an apparatus in accordance with the invention, is that this apparatus is configured as an arrangement for manufacturing magnetic tapes with pre-recorded digital video signals and digital audio signals. Such an apparatus in accordance with the invention is configured only to record digital video signals and digital audio signals in inclined tracks in order to enable pre-recorded magnetic tapes to be manufactured with a high recording quality.

According to the invention, a magnetic tape of the type defined in the third paragraph is characterized in that tracks groups which adjoin one another successively in the longitudinal direction of the tape, which are each of similar configuration, and which each comprise four successively adjacent tracks, have been provided on the magnetic tape, and of the four successively adjacent tracks of each track group, the first track contains a recording made with a magnetic head having a first azimuth angle and the second track contains a recording made with a magnetic head having a second azimuth angle, and the third track contains a recording made with a magnetic head having an azimuth angle opposite to the first azimuth angle, and the fourth track contains a recording made with a magnetic head having an azimuth angle opposite to the second azimuth angle.

An advantageous variant of a magnetic tape in accordance with the invention is characterized in that the first track contains a recording made with a magnetic head having a positive first azimuth angle and the second track contains a recording made with a magnetic head having a positive second azimuth angle, and in that the first azimuth angle is larger than the second azimuth angle.

Another advantageous variant of a magnetic tape in accordance with the invention is characterized in that the recordings contained in the four tracks of each track group have been made with magnetic heads whose azimuth angles correspond to the azimuth angles known from the VHS system.

A further advantageous variant of a magnetic tape in accordance with the invention is characterized in that the first azimuth angle has a nominal value of 30° and the second azimuth angle has a nominal value of 6°0.

BRIEF DESCRIPTION OF THE DRAWINGS

The invention will be described with reference to four exemplary embodiments of the invention which are shown in the drawings but to which the invention is not limited, in which:

FIG. 1 shows, diagrammatically, a relevant part of a prior-art video recorder in accordance with the VHS standard, by means of which analog video signals in accordance with a PAL television standard and analog audio signals can be recorded and reproduced;

FIG. 2 is a diagrammatically developed view showing the positions of the head gaps of magnetic heads on a rotationally drivable head support of a drum-shaped scanning device of the prior-art video recorder shown in FIG. 1;

FIG. 3 shows a part of a first track pattern already recorded on a magnetic tape having tracks capable of being scanned by two head pairs of the prior-art video recorder in FIG. 1 in a so-called Short-Play mode in order to reproduce analog PAL video signals and analog audio signals, and a part of a second track pattern already recorded on a magnetic tape, whose tracks can be scanned by means of two head pairs of the prior-art video recorder in FIG. 1 in a so-called Long-Play mode in order to reproduce analog PAL video signals and analog audio signals;

DESCRIPTION OF THE PREFERRED EMBODIMENTS

Figure 4:
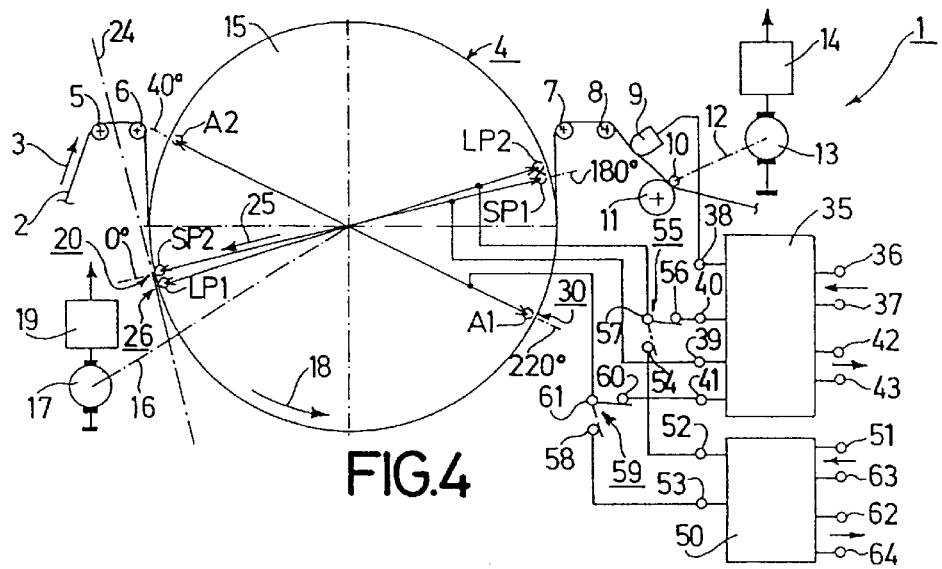
FIG. 4, in a way similar to FIG. 1, shows, diagrammatically, a part of a video recorder in accordance with a first embodiment of the invention, which is adapted to record and reproduce analog video signals in accordance with a PAL standard and analog audio signals, and to record and reproduce digital video signals and digital audio signals.

FIG. 1 shows, diagrammatically, a part of a known priorart video recorder 1. The video recorder 1 is constructed to record and reproduce analog video signals and analog audio signals on a magnetic tape 2 in adjacent tracks which are inclined relative to the longitudinal or forward direction of the tape indicated by an arrow 3, i.e., in inclined tracks. For this purpose, the video recorder 1 comprises a drum-shaped scanning device 4 around which the magnetic tape 2 is wrapped along a helical path during the recording and reproduction of signals, which is not shown in FIG. 1 but which is generally known to those skilled in the art. Four movable tape guides 5, 6, 7 and 8 serve to wrap the magnetic tape 2 and to keep it wrapped around the drum-shaped scanning device 4.

The magnetic tape 2 is further in scanning contact with a stationary magnetic head 9, by means of which analog signals can be recorded on and reproduced from the magnetic tape 2 in a track which extends in the longitudinal direction 3 of the tape, i.e., in a longitudinal track. The magnetic tape 2 is further wrapped around a capstan 10. A movable pressure roller 11 presses the magnetic tape 2 against the capstan 10 during recording and reproduction of signals. The capstan 10 can be driven by a motor 13 via a drive transmission 12, which is shown, diagrammatically, as a dash-dot line. The motor 13 is powered by a power supply 14. The power supply 14 includes a speed control device for driving the motor 13, and hence the capstan 10, at the given constant speeds desired in each case. In the video recorder 1 shown in FIG. 1, the magnetic tape 2 can be driven to record and reproduce analog PAL video signals and analog audio signals with a tape speed v(P)=2.34 m/s in a so-called Short-Play mode, and with a tape speed v(P/2)=v(P)/2=1.17 m/s in a Long-Play mode.

The drum-shaped scanning device 4 comprises a rotationally drivable head support 15 carrying a plurality of magnetic heads. The rotationally drivable head support 15 can be driven by a motor 17 in a direction indicated by an arrow 18 via a drive transmission 16, which is also shown, diagrammatically, as a dash-dot line. A power supply 19 serves to power the motor 17. The power supply 19 includes a speed control device for driving the motor 17, and hence the head support 15, at at least one desired given constant speed. In the video recorder 1 shown in FIG. 1, the rotationally drivable head support 15 is driven with a speed n(P)=1500 r.p.m. in all the modes of operation.

For the transmission of analog PAL video signals while the magnetic tape 2 is driven with the normal tape speed v(P), the head support 15 carries a first head pair 20 of two diagonally mounted magnetic heads SP1 and SP2, having head gaps with oppositely oriented comparatively small first azimuth angles, by means of which the magnetic tape 2 can be scanned along first adjacent inclined tracks 21 and 22, as is illustrated by the part of a track pattern shown in the upper part of FIG. 3.

FIG. 2 shows, diagrammatically, a development of the head support 15 in a plane 24 represented, diagrammatically, as a dash-dot line in FIG. 1, FIG. 2 showing this development viewed in the direction indicated by the arrow 25 in FIG. 1.

As is apparent from FIGS. 1 and 2, the head gap of the magnetic head SP2 occupies an angular position referred to as 0° and the magnetic head SP1 occupies the diagonally opposed angular position of 180° in the situation shown. FIG. 2 also illustrates the height positions of the head gaps of the magnetic heads SP2 and SP1 relative to the head support 15, i.e., relative to a reference surface having a height H=0 on the head support 15. The two magnetic heads SP1 and SP2 each have a head gap with a gap width of approximately 48 $\mu$m. Consistent with accepted terminology in the field, the direction of the gap width of a magnetic head corresponds to the direction of the track width of the track scanned by the magnetic head, and the gap length of a magnetic head corresponds to the length direction, predominantly along the direction of tape travel, of the track scanned by the magnetic head. The gap length of the head gap of each of the two magnetic heads SP1 and SP2 has a value of approximately 0.45 $\mu$m. The magnetic head SP1 has an azimuth angle of approximately +6°, and the magnetic head SP2 has an azimuth angle of approximately −6°. These azimuth angles cannot be shown properly in FIG. 2 as this would require an extremely large scale in the direction of the gap width, i.e., in the height direction of the drawing, for which reason the azimuth angles of the head gaps have not been shown in FIG. 2. The azimuth angles of the two magnetic heads SP1 and SP2 are represented in FIG. 3 by the tracks 21 and 22 which are scanned by these magnetic heads. The representation of the azimuth angles applies also for the azimuth angles of all the others of magnetic heads mentioned hereinafter. For the transmission of analog video signals while the magnetic tape 2 is driven with the reduced tape speed v(P/2), the head support 15 further carries a second head pair 26 of two diagonally mounted magnetic heads LP1 and LP2, having head gaps with oppositely oriented comparatively small second azimuth angles, by means of which the magnetic tape 2 can be scanned along second adjacent inclined tracks 27 and 28, as is illustrated by the part of a track pattern in the lower part of FIG. 3. The head gaps of the magnetic heads LP1 and LP2 occupy angular positions close beside and before the head gaps of the magnetic heads SP2 and SP1 in a direction identical to that indicated by the arrow 18. The angular distance between the head gaps of the magnetic heads LP1 and SP2 or LP2 and SP1, respectively, essentially corresponds to twice the distance by which two successive line synchronization pulses of an analog video signal will be or have been recorded in an oblique track, which is of known dimension. FIG. 2 also shows the height positions of the head gaps of the magnetic heads LP1 and LP2 relative to the head support, i.e., relative to its reference surface having the height H=0. The two magnetic heads LP1 and LP2 each have a head gap with a gap width of approximately 35 $\mu$m. The gap length of the head gap of each of the two magnetic heads LP1 and LP2 is approximately 0.45 $\mu$m. The magnetic head LP1 has a head gap with an azimuth angle of approximately +6°, and the magnetic head LP2 has a head gap with an azimuth angle of approximately −6°, as is illustrated in the track pattern 29 shown in FIG. 3 by the solid-line hatching. As is apparent from FIG. 3, the head gaps of the magnetic heads LP1 and LP2 have an excess width in relation to the tracks 27 and 28, as a result of which during the recording of video signals by means of the two magnetic heads LP1 and LP2, a part of the wider track recorded previously by a magnetic head LP1 or LP2 is partly overwritten by the respective magnetic head LP2 or LP1 which subsequently scans the magnetic tape 2. This is a step long known to those skilled in the art.

For the transmission of analog audio signals at the tape speeds v(P) and v(P/2), the head support 15 further carries a further head pair 30 of two diagonally arranged magnetic heads A1 and A2 having head gaps with oppositely oriented comparatively large further azimuth angles, by means of which the magnetic tape 2 can be scanned along further adjacent inclined tracks 31, 32 and 33, 34 respectively, as is illustrated by the track patterns 23 and 29 in FIG. 3. The head gaps of the magnetic heads A1 and A2 are situated at angular positions which are 400 spaced from and situated behind the head gaps of the magnetic heads SP1 and SP2 in a direction opposite to that indicated by the arrow 18. FIG. 2 also shows the height positions of the head gaps of the magnetic heads A1 and A2 relative to the head support 15, i.e., relative to its reference surface having the height H=0. The magnetic heads A1 and A2 each have a head gap with a gap width of approximately 32 μm. The gap length of the head gap of each of the two magnetic heads A1 and A2 is approximately 1.2 μm. The magnetic head A1 has a head gap with an azimuth angle of approximately +30° and the magnetic head A2 has a head gap with an azimuth angle of approximately −30°, as is illustrated in the track patterns 23 and 29 by the broken-line hatchings in the tracks 31, 32 and 33, 34 respectively.

It is to be noted that during the recording of analog video signals and analog audio signals, depending on the mode of operation, the magnetic heads A2 and A1 first write an analog audio signal in the respective tracks 31, 32 and 33, 34 scanned by these heads, the analog audio signal being recorded in deeper situated tape layers of the magnetic tape 2, after which, depending on the mode of operation, the magnetic heads SP1 and SP2 or LP1 and LP2 record the analog video signals into the respective tracks 21, 22 and 27, 28 scanned by them, this recording being effected in higher situated tape layers, overwriting the audio signal component stored in the deeper situated tape layers. This is a step long known to those skilled in the art.

It is to be noted that the head support 15 of the drum-shaped scanning device 4 may also carry further magnetic heads. These heads may be, for example, magnetic erase heads for the track-by-track erasure of signals stored in inclined tracks.

The video recorder 1 has a signal processing device 35 for processing analog PAL video signals and analog audio signals. This signal processing device 35 inter alia includes a modulator device and a demodulator device for modulating and demodulating the luminance signal components of the analog PAL video signals, and frequency conversion devices for the frequency conversion of the chrominance signal components of the analog PAL video signals, as well as frequency-response-modifying circuit elements, amplifiers and an audio signal processing device for processing the analog audio signals which can be recorded and reproduced by means of the stationary magnetic head 9 but also for the frequency-modulation and frequency-demodulation of analog audio signals to enable frequency-modulated analog audio signals to be recorded by means of the rotationally drivable magnetic heads A1 and A2, and to enable frequency-modulated analog audio signals reproduced by means of the magnetic heads A1 and A2 to be frequency-demodulated, respectively. Such a device for processing analog video signals and analog audio signals is known, for example, from video recorder which is commercially available from Philips Electronics under the type designation VR 632.

The signal processing device 35 has a first input 36 for receiving an analog PAL video signal. The signal processing device 35 further has a second input 37 for receiving an analog audio signal.

The signal processing device 35 further has a first terminal 38. Analog audio signals processed by the signal processing device 35 can be applied to the stationary magnetic head 9 in order to be recorded in a longitudinal track on the magnetic tape 2 and analog audio signals reproduced by means of the stationary magnetic head 9 can be applied to the signal processing device 35 in order to be processed via the first terminal 38. The signal processing device 35 further has a second terminal 39. Analog PAL video signals processed by the signal processing device 35 can be applied to the two magnetic heads SP1 and SP2 in the Short-Play mode in order to be recorded, and analog PAL video signals reproduced by the two magnetic heads SP1 and SP2 in the Short-Play mode can be applied to the signal processing device 35 in order to be processed, via the second terminal 39. The signal processing device 35 further has a third terminal 40. Analog PAL video signals processed by the signal processing device 35 in the Long-Play mode can be applied to the magnetic heads LP1 and LP2 in order to be recorded on the magnetic tape 2, and analog PAL video signals reproduced by the two magnetic heads LP1 and LP2 in the Long-Play mode can be applied to the signal processing device 35 in order to be processed, via the third terminal 40. The signal processing device 35 further has a fourth terminal 41. Frequency-modulated analog audio signals processed by the signal processing device 35 can be applied to the two magnetic heads A1 and A2 in order to be recorded on the magnetic tape 2 in inclined tracks, and frequency-modulated analog audio signals reproduced by the two magnetic heads A1 and A2 can be applied to the signal processing device 35 in order to be frequency-demodulated and further processed, via the fourth terminal 41. It is to be noted that a rotary transformer is arranged between the terminals 39, 40, 41 and the magnetic heads SP1, SP2 and LP1, LP2, and A1, A2, but this is not shown in FIG. 1.

The signal processing device 35 further has a first output 42 at which the reproduced analog PAL video signals processed by the signal processing device 35 are available. The signal processing device 35 further has a second output 43 at which the reproduced analog audio signals processed by the signal processing device 35 are available.

In a Short-Play mode, in which the magnetic tape 2 is driven in the forward direction 3 with the normal tape speed v(P) and the rotationally drivable head support 15 is driven with a speed n(P)=1500 r.p.m., the video recorder 1, shown in FIG. 1, enables analog PAL video signals and analog audio signals to be recorded in and reproduced from the tracks 21, 22, 31 and 32 in accordance with the track pattern 23, recording and reproduction being effected with the magnetic heads A1, A2 and SP1, SP2. In a Long-Play mode, in which the magnetic tape 2 is driven in the forward direction 3 with half the tape speed v(P/2) and the head support 15 is driven with a speed n(P)=1500 r.p.m., the video recorder 1 further enables analog PAL video signals and analog audio signals to be recorded in and reproduced from the tracks 27, 28, 33 and 34 in accordance with the track pattern 29, recording and reproduction being effected with the magnetic heads A1, A2 and LP1, LP2.

Figure 5:
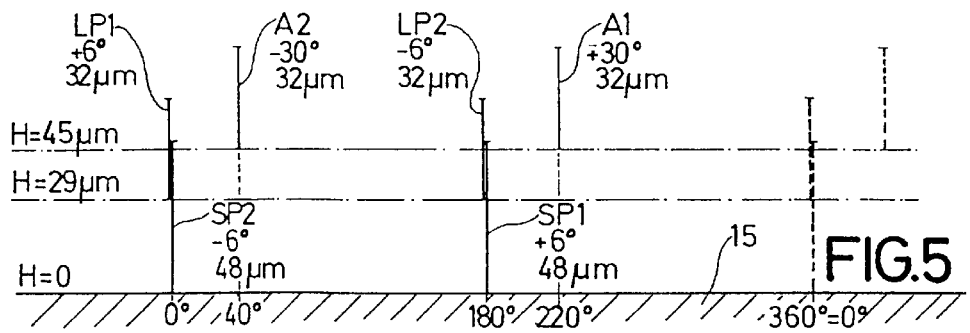
FIG. 5 is a diagrammatically developed view showing the positions of the head gaps of magnetic heads on a rotationally drivable head support of a drum-shaped scanning device of the video recorder shown in FIG. 4.

FIG. 4, in a similar way to FIG. 1, shows, diagrammatically, a part of a video recorder in accordance with a first embodiment of the invention. The video recorder 1 also comprises a drum-shaped scanning device 4 with a rotationally drivable head support 15. The head support 15 also carries three pairs 20, 26, 30 of magnetic heads SP1, SP2, and LP1, LP2, and A1, A2. However, in comparison with the video recorder 1 shown in FIG. 1, the magnetic heads LP1 and LP2 of the second head pair 26 in the video recorder 1 shown in FIG. 4 have different relative positions with respect to the magnetic heads SP1 and SP2 of the first head pair 20 and the magnetic heads A1 and A2 of the second head pair 30 as well as the head support 15. As will appear from a comparison of FIGS. 2 and 5, the magnetic heads LP1 and LP2 of the second head pair 26 in the video recorder 1 shown in FIG. 4, occupy higher height positions relative to the head support 15 than in the video recorder 1 in FIG. 1. In the video recorder 1 shown in FIG. 4 the magnetic heads LP1 and LP2 of the second head pair 26 and the magnetic heads A1 and A2 of the further head pair 30 are arranged on the head support 30 in such a relationship to one another that the magnetic heads LP1 and LP2 of the second head pair 26 and the magnetic heads A1 and A2 of the further head pair 30 scan interleaved inclined tracks 44, 45, 46, 47, 48 when the magnetic tape 2 is driven with a given tape speed v(D) in the forward direction 3 and the head support is driven with a given speed n(D) in the direction indicated by the arrow 18. In so doing, one of the inclined tracks 44, 46 and 48 scanned by a magnetic head LP1 or LP2 of the second head pair 26 is situated between two of the inclined tracks 45 and 47 scanned by the magnetic heads A2 and A1 of the further head pair 30, as can be seen in the track pattern 49 shown in FIG. 9.

In the video recorder 1 shown in FIG. 4, the given tape speed v(D) has a value v(D)=v(N)=3.33 m/s. This speed v(N) corresponds to the normal tape speed in a Short-Play mode of a video recorder in accordance with the VHS standard for recording and reproducing video signals in conformity with the NTSC television standard. However, said given tape speed v(D) in the video recorder 1 as shown in FIG. 4 may also have a value which differs from v(N).

In the video recorder 1 shown in FIG. 4, the given speed of rotation n(D) has a value n(D)=n(N)=1800 r.p.m. This speed n(N) corresponds to the normal head speed of a video recorder in accordance with the VHS standard for recording and reproducing video signals in conformity with the NTSC standard. However, this speed n(D) may also have a value which differs from n(N).

In the video recorder 1 shown in FIG. 4, a magnetic tape 2 can be driven not only with said given tape speed v(D)=v(N), but also with the normal tape speed v(P) already mentioned with reference to the video recorder 1 of FIG. 1, this normal tape speed having a value of 2.34 m/s and corresponding to the normal tape speed in a Short-Play mode of a video recorder in accordance with the VHS standard for recording and reproducing video signals in conformity with a PAL standard.

In the video recorder 1 shown in FIG. 4, the rotationally drivable head support 15 with the magnetic heads it carries can be driven not only with the speed n(D)=n(N)=1800 r.p.m., but also with the speed n(P)=1500 r.p.m.

In the video recorder 1 shown in FIG. 4, the magnetic heads SP1 and SP2 of the first head pair 20 have the same values for their azimuth angles, their gap widths and their gap lengths as in the video recorder 1 shown in FIG. 1. The magnetic head SP1 has a head gap with an azimuth angle of approximately +6°, a gap width of approximately 48 µm, and a gap length of approximately 0.45 µm. The magnetic head SP2 has a head gap with an azimuth angle of approximately −6°, a gap width of approximately 48 µm, and a gap length of approximately 0.45 µm. However, alternatively, the head gaps of the magnetic heads SP1 and SP2 may each have a gap length of approximately 0.33 µm.

The magnetic heads A1 and A2 of the further head pair 30 of the video recorder 1 shown in FIG. 4 have the same values for their azimuth angles and their gap widths as in the video recorder 1 shown in FIG. 1. The magnetic head A1 has a head gap with an azimuth angle of approximately +30° and a gap width of approximately 32 µm. The magnetic head A2 has a head gap with an azimuth angle of approximately −30° and a gap width of approximately 32 µm. However, in comparison with the magnetic heads A1 and A2 of the video recorder 1 shown in FIG. 1, the magnetic heads A1 and A2 of the video recorder 1 shown in FIG. 4 have differently dimensioned gap lengths. The magnetic heads A1 and A2 of the video recorder 1 in FIG. 4 each have a head gap with a gap length of approximately 0.30 µm.

The magnetic heads LP1 and LP2 of the second head pair 26 of the video recorder 1 shown in FIG. 4 have azimuth angles of the same values as the corresponding magnetic heads LP1 and LP2 of the video recorder 1 shown in FIG. 1. The magnetic head LP1 has a head gap with an azimuth angle of approximately +6° and the magnetic head LP2 has a head gap with an azimuth angle of approximately −6°. The gap length of the head gap of each of the two magnetic heads LP1 and LP2 of the video recorder 1 in FIG. 4, however, is approximately 0.30 µm, whereas the gap length of the head gap of each of the two magnetic heads LP1 and LP2 of the video recorder 1 in FIG. 1 has a value of approximately −0.45 µm. The gap width of the head gap of each of the two magnetic heads LP1 and LP2 of the video recorder 1 in FIG. 4 is approximately 32 µm, whereas the gap width of the head gaps of the magnetic heads LP1 and LP2 of the video recorder in FIG. 1 has a value of approximately 35 µm.

The video recorder 1 in FIG. 4 further comprises a signal processing device 50 for processing digital video signals and digital audio signals. The signal processing device 50 has a first input 51 for receiving analog video signals. The analog video signals at the first input 51 are applied to the signal processing device 50. In the signal processing device 50, these analog video signals are digitized and processed in order to be recorded in digital form. After this, the video signals, which have been processed in the signal processing device 50 in order to be recorded in digital form, are applied to a first terminal 52 and to a second terminal 53. In a modified embodiment, it is alternatively possible to apply digital video signals directly to the first input 51 of a signal processing device 50. Moreover, a signal processing device 50 may have two separate first inputs, one input being arranged to receive analog video signals and the other input being arranged to receive digital video signals.

The first terminal 52 is connected to a first terminal 54 of a first switching device 55. The first switching device 55 has a second terminal 56 connected to the third terminal 40 of the signal processing device 35. A change-over terminal 57 of the first switching device 55 is connected to the magnetic heads LP1 and LP2 of the second head pair 26 via a rotary transformer, not shown. The second terminal 53 of the signal processing device 50 is connected to a first terminal 58 of a second switching device 59. The second switching device 59 has a second terminal 60 connected to the fourth terminal 41 of the signal processing device 35. A change-over terminal 61 of the second switching device is connected to the magnetic heads A1 and A2 of the second head pair 30 via a rotary transformer, not shown. The digital video signals to be recorded can be applied from the two terminals 52 and 53 to the magnetic heads LP1, A2, LP2, A1 via the two switching devices 55 and 59, these four magnetic heads LP1, A2, LP2, A1 recording the digital video signals applied to them in the adjacent tracks 44, 45, 46, 47 and 48 on a magnetic tape 2, the magnetic tape 2 being driven in the forward direction 3 with the tape speed v(D)=v(N).

Digital video signals reproduced from the tracks 44, 45, 46, 47 and 48 by the magnetic heads LP1, A2, LP2, A1 can be applied to the two terminals 52 and 53 of the signal processing device 50 via the two switching devices 55 and 59. In the signal processing device 50, the reproduced digital video signals applied to it are processed and subsequently converted into analog video signals. The converted analog video signals are applied to a first output 62 of the signal processing device 50, where they are available for further processing. In a modified embodiment, conversion of the processed digital via into analog video signals may be omitted, in which case a signal processing device 50 supplies digital video signals at its first output 62; these signals may still be combined with digital audio signals. However, a signal processing device 50 may alternatively have two separate first outputs, in which case digital video signals are available at one output and analog video signals are available at the other output.

The signal processing device 50 further has a second input 63, to which analog audio signals can be applied. Applied analog audio signals are applied from the second input 63 to the signal processing device 50 and, in the signal processing device 50, they are converted into digital audio signals and processed for recording on the magnetic tape 2. The digital audio signals processed for recording on the magnetic tape 2 are also supplied to the two terminals 52 and 53 of the signal processing device 50 similarly to the processed digital video signals to be recorded, the processed digital audio signals to be recorded and the processed digital video signals to be recorded being interleaved with one another. The processed digital audio signals are recorded on the magnetic tape 2 in the same way as the digital video signals in the tracks 44, 45, 46, 47 and 48 by means of the magnetic heads LP1, A2, LP2 and A1. In a modified embodiment, digital audio signals may also be applied directly to the second input 63 of a signal processing device 50 if such digital audio signals have not yet been applied to the first input 51 of this signal processing device 50 in interleaved form with digital video signals. Moreover, a signal processing device 50 may have two separate inputs, in which case analog audio signals can be applied to the one input and digital audio signals can be applied to the other input.

Digital audio signals reproduced from the magnetic tape 2 together with the digital video signals with which they are interleaved are applied to the terminals 52 and 53 of the signal processing device 50 via the switching devices 55 and 59. In the signal processing device 50, the digital audio signals are separated from the digital video signals and are subsequently converted into analog audio signals. The analog audio signals are applied to a second output 64 of the signal processing device 50, at which they are available for further processing. In a modified embodiment, the conversion of the processed digital video signals into analog video signals may be omitted, in which case a signal processing device 50 supplies digital audio signals at its second output, which signals may still be interleaved with digital video signals. A signal processing device 50, however, may also have two separate second outputs, in which case digital audio signals are available at the one output and analog audio signals are available at the other output.

The video recorder 1 shown in FIG. 4 is suitable for recording and reproducing analog PAL video signals and associated audio signals and for recording and reproducing digital video signals and associated digital audio signals.

Figure 6:
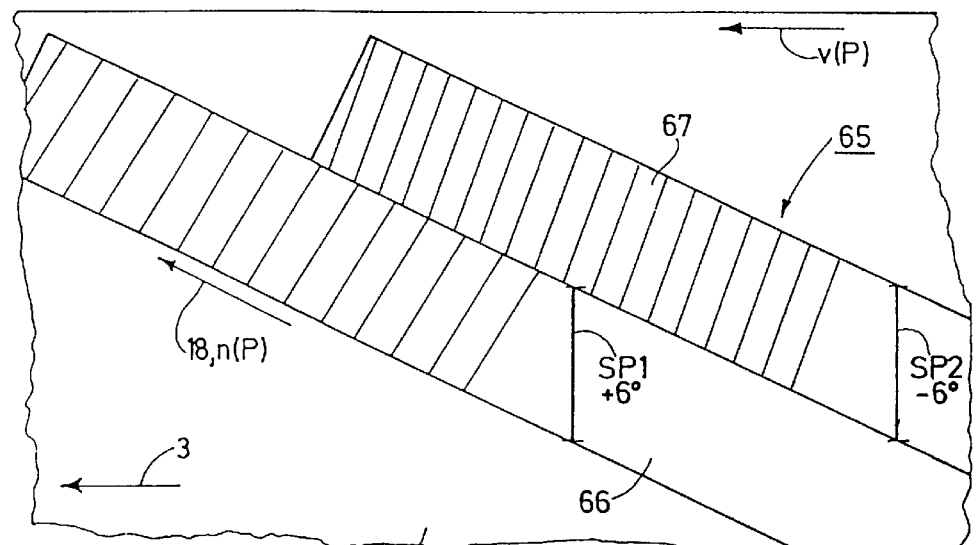
FIG. 6 shows a part of a track pattern already recorded on a magnetic tape, for example, by means of a video recorder as shown in FIG. 1, whose tracks can be scanned by means of one head pair of the video recorder in FIG. 4 in a so-called Short-Play mode in order to reproduce analog PAL video signals.

FIG. 6 shows a part of a track pattern 65 comprising two tracks 66 and 67 and recorded by a video recorder for recording PAL video signals in a Short-Play mode. The track pattern 65 may have been recorded, for example, by means of a known video recorder 1 as shown in FIG. 1.

The analog PAL video signals stored in the tracks 66 and 67 of the track pattern 65 can be read and reproduced by the magnetic heads SP1 and SP2 of the first head pair 20 of the video recorder 1 shown in FIG. 1 in a Short-Play mode when the magnetic tape 2 is driven in the forward tape transport direction 3 with the tape speed v(P)=2.34 m/s, and the magnetic heads SP1 and SP2 are driven with the speed n(P)=1500 r.p.m., as is indicated in FIG. 6. The reproduced analog video signals are applied to the second terminal 39 of the signal processing device 35 and are subsequently processed in the signal processing device 35.

Likewise, it is possible to record analog PAL video signals on a magnetic tape 2 by the magnetic heads SP1 and SP2 of the video recorder 1 of FIG. 1 in a Short-Play mode, in which case, the magnetic tape 2 is also driven with the tape speed v(P)=2.34 m/s, and the magnetic heads SP1 and SP2 are driven with the speed n(P)=1500 r.p.m., and the magnetic heads SP1 and SP2 record the analog PAL video signals applied to them in tracks 66 and 67 in accordance with the track pattern 65, which is shown partly in FIG. 6. The recorded analog PAL video signals are applied to the magnetic heads SP1 and SP2 from the signal processing device 35 via the second terminal 39 of this device.

Figure 7:
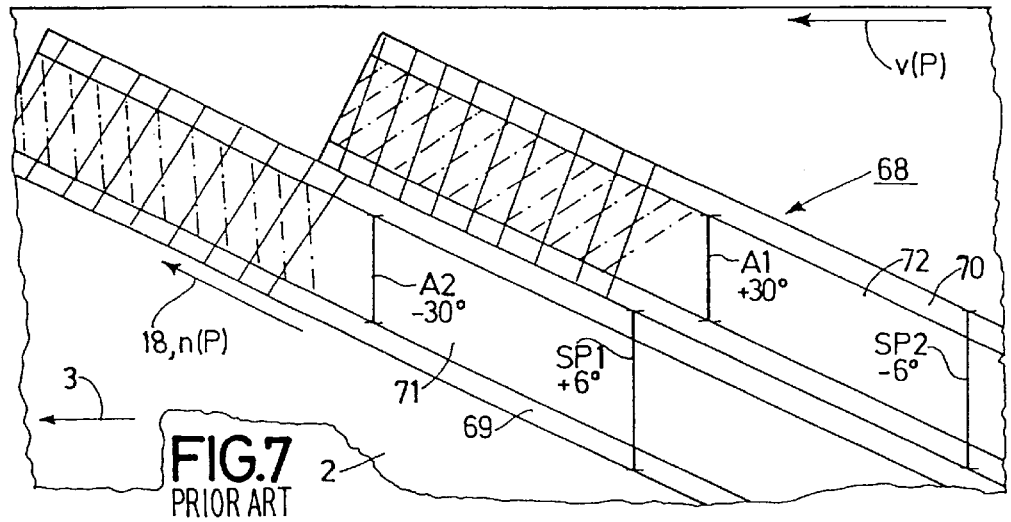
FIG. 7 shows a part of a track pattern already recorded on a magnetic tape, for example, by means of a video recorder as shown in FIG. 1, having tracks capable of being scanned by two head pairs of the video recorder in FIG. 4 in a Short-Play mode in order to reproduce analog PAL video signals and analog audio signals.

FIG. 7 shows a further part of a track pattern 68 comprising tracks 69 and 70 as well as 71 and 72. The tracks 69 and 70 contain analog PAL video signals. The tracks 71 and 72 contain associated analog audio signals in frequency-modulated form. The signals have been recorded by means of a known video recorder for recording and reproducing analog PAL video signals and associated analog frequency-modulated audio signals in a Short-Play mode. Recording may have been effected by means of, for example, a video recorder 1 as shown in FIG. 1.

The recorded analog PAL video signals can be scanned and reproduced by means of the magnetic heads SP1 and SP2 and the associated analog audio signals can be scanned and reproduced by means of the magnetic heads A1 and A2, despite their small gap lengths of only 0.30 μm, in a Short-Play mode of the video recorder 1 shown in FIG. 4 when the magnetic tape 2 is driven in the forward tape-transport direction 3 with the tape speed v(P)=2.34 m/s, and the magnetic heads are driven in the direction indicated by the arrow 18 with a speed of rotation of n(P)=1500 r.p.m., as is indicated in FIG. 7. The reproduced analog video signals are applied to the second terminal 39 of the signal processing device 35 and are subsequently processed in the signal processing device 35. The reproduced analog audio signals are applied to the fourth terminal 41 of the signal processing device 35 via the second switching device 35 and are subsequently processed in the signal processing device 35.

As already stated, it is possible to record analog PAL video signals by the magnetic heads SP1 and SP2 of the video recorder 1 of FIG. 4 in a Short-Play mode. Recording of analog audio signals by the magnetic heads A1 and A2 is not possible because the gap length of 0.30 μm of the head gaps of these two magnetic heads A1 and A2 is too small for the recording of analog audio signals. However, recording of analog audio signals is possible by the stationary magnetic head 9, to which analog audio signals can be applied from the first terminal 38 of the signal processing device 35. Analog audio signals reproduced by the stationary magnetic head are applied to the first terminal 38 of the signal processing device 35 for processing these signals.

Figure 8:
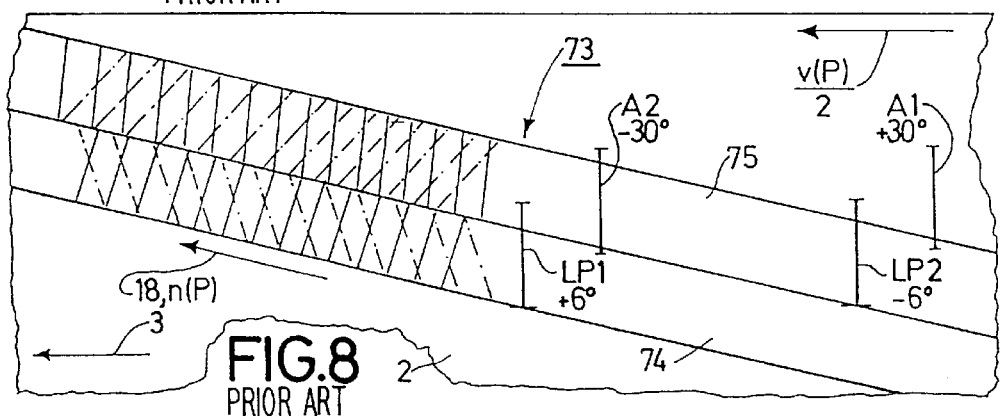
FIG. 8 shows a part of a track pattern already recorded on a magnetic tape, for example, by means of a video recorder as shown in FIG. 1, having tracks capable of being scanned by two head pairs of the video recorder in FIG. 4 in a Long-Play mode in order to reproduce analog PAL video signals.

FIG. 8 shows a part of a further track pattern 73 comprising tracks 74 and 75, which have been recorded on the magnetic tape 2 in a Long-Play mode by a known video recorder for recording and reproducing analog PAL video signals and associated analog audio signals, for which the magnetic tape 2 was driven in the forward tape transport direction 3 with half the tape speed v(P/2)=V(P)/2=1.17 m/s, and the magnetic heads were driven in the direction indicated by the arrow 18 with a speed of rotation n(P)=1500 r.p.m.

Of the signals stored in accordance with the track pattern 73 in the tracks 74 and 75, the analog PAL video signals stored in the tracks 74 and 75 can be reproduced in a Long-Play mode by the magnetic heads LP1 and LP2. Likewise, the recording of analog PAL video signals is possible in a Long-Play mode by the magnetic heads LP1 and LP2. Both during reproduction and during recording of analog PAL video signals in the Long-Play mode, the magnetic heads LP1 and LP2 are connected to the third terminal 40 of the signal processing device 35 via the first switching device 55. In the Long-Play mode, the magnetic tape is driven with the tape speed v(P/2)=V(P)/2=1.17 m/s, and the magnetic heads are driven with a speed of rotation n(P)=1500 r.p.m. During the recording of analog PAL video signals, the magnetic heads LP1 and LP2 of the video recorder shown in FIG. 4 writes the same tracks 74 and 75 in accordance with the track pattern 73 as with a known video recorder for recording and reproducing analog PAL video signals and analog audio signals. It is to be noted that the magnetic heads LP1 and LP2 have an excess width in relation to the tracks 74 and 75.

By means of the magnetic heads A2 and A1 of the video recorder 1 shown in FIG. 4, it is not possible to reproduce the analog audio signals stored in the tracks 74 and 75 in the relative positions, shown in FIG. 8, of the head gaps of the magnetic heads LP1, A2, LP2, A1 with respect to the tracks 74 and 75 to be scanned, because the magnetic head A2, having a head gap with an azimuth angle of approximately −30°, always scans a track, for example the track 75, in which the analog audio signals have been recorded with a magnetic head having a head gap with an azimuth angle of +30°. Likewise, the magnetic head A1, having a head gap with an azimuth angle of approximately +30°, always scans a track, for example the track 74, recorded by means of a magnetic head having a head gap with an azimuth angle of −30°. However, by means of a tracking servo device provided in the video recorder 1 shown in FIG. 4, the head gaps of the magnetic heads LP1, A2, LP2, A1 can be brought into such relative positions with respect to the tracks to be scanned that a satisfactory tracking is obtained for all the four magnetic heads, thereby guaranteeing a correct scanning of the tracks and a correct reproduction of the analog video signals and analog audio signals recorded in these tracks.

Figure 9:
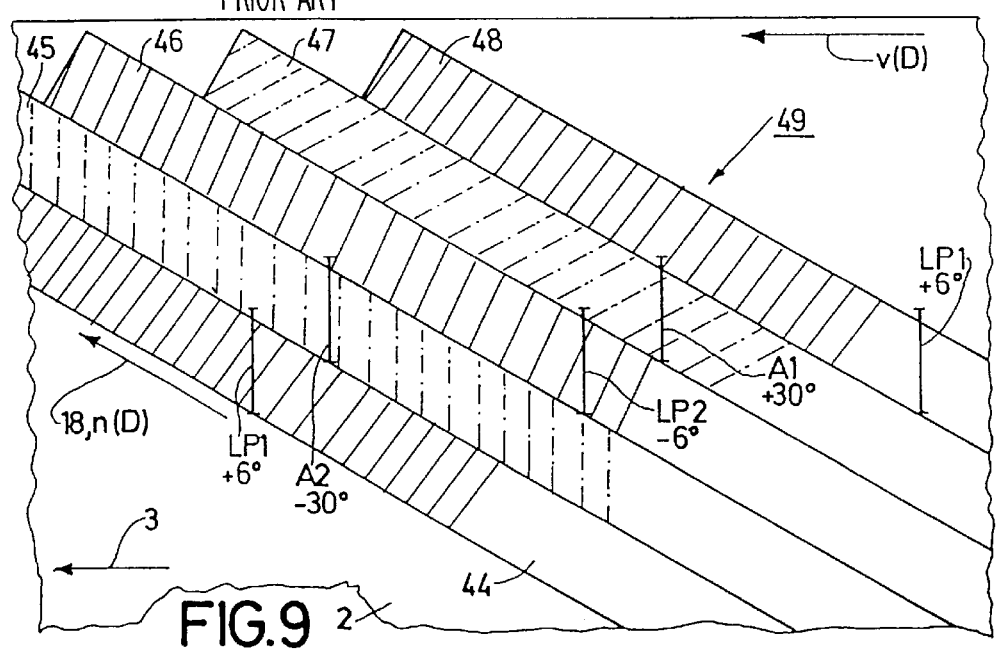
FIG. 9 shows a part of a track pattern on a magnetic tape having tracks capable of being scanned at a given tape speed by two head pairs of the video recorder in FIG. 4 in order to record and reproduce digital video signals and digital audio signals in a Short-Play mode.

FIG. 9 shows the afore-mentioned track pattern 49 comprising the tracks 44, 45, 46 and 47 and 48. The tracks 44, 45, 46 and 47 are successively scanned by the magnetic heads LP1, A2, LP2, A1 in one complete revolution of the head support 15 when the magnetic tape 2 is driven in the forward tape transport direction 3 with the tape speed v(D)=v(N)= 3.33 m/s, and the magnetic heads are driven in the direction indicated by the arrow 18 with said speed of rotation n(D)=n(N)=1800 r.p.m. in a Short-Play mode for the recording and reproduction of digital video signals and digital audio signals. The four tracks 44, 45, 46 and 47 scanned by the magnetic heads LP1, A2, LP2 and A1 in one revolution of the head support 15 provide enough storage capacity to record the digital video signals and digital audio signals, which are interleaved with one another, on the magnetic tape 2. During the recording and reproduction of digital video signals and digital audio signals, the magnetic heads LP1, LP2 and A1, A2 are connected to the terminals 52 and 53 of the signal processing device 50 via the switching devices 55 and 59. It is to be noted that the head gaps of the magnetic heads LP1, A2, LP2 and A1 have a slight excess width in relation to the tracks 44, 45, 47 and 48.

Thus, the video recorder 1 shown in FIG. 4 constitutes an apparatus by means of which it is possible to record and reproduce analog PAL video signals, to reproduce analog audio signals, and to record and reproduce digital video signals and digital audio signals in/from inclined tracks, the transmission of analog video signals and analog audio signals and for the recording and reproduction of digital video signals and digital audio signals being effected with the same number of magnetic heads. The transmission of analog video signals and analog audio signals with a video recorder in accordance with the invention is possible because the magnetic heads required for this purpose have head gaps whose azimuth angles have values as used in known video recorders in accordance with the VHS standard. Recording and reproduction of digital video signals and digital audio signals by means of a video recorder in accordance with the invention by magnetic heads suitable for the transmission of analog PAL video signals and analog audio signals is achieved very simply in that these magnetic heads are arranged in a new relationship to one another, which differs from the relationship as used in the known VHS video recorders, and in that the head gaps of these magnetic heads have a gap length suitable for the recording and reproduction of digital signals.

Figure 10:
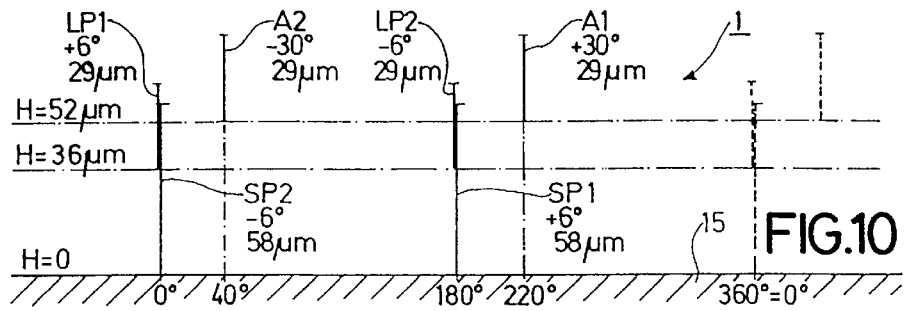
FIG. 10, similarly to FIGS. 2 and 5, is a diagrammatically developed view showing the positions of the head gaps of magnetic heads on a head support of a drum-shaped scanning device of a video recorder in accordance with a second embodiment of the invention, which is adapted to record and reproduce analog video signals in accordance with the NTSC standard and analog audio signals and to record and reproduce digital video signals and digital audio signals.

A video recorder 1 in accordance with a second exemplary embodiment of the invention will now be described with reference to FIGS. 10 to 14, this video recorder being constructed and suited to record and reproduce analog video signals in accordance with the NTSC standard, and the associated analog audio signals, and to record and reproduce digital video signals and associated digital audio signals. The construction of this video recorder 1 in accordance with the invention basically corresponds to the construction of the video recorder 1 shown in FIG. 4, and FIG. 10 only shows the head gaps of the magnetic heads SP1, SP2, LP1, LP2, A1 and A2 of the video recorder 1 in accordance with the second embodiment of the invention. The video recorder 1 in accordance with the invention as shown in FIG. 10 has another arrangement of the magnetic heads SP1, SP2, LP1, LP2, A1 and A2 in comparison with the rotationally drivable head support 15 as used in the video recorder 1 shown in FIGS. 4 and 5. The angular positions and the height positions of the individual magnetic heads SP1, SP2, LP1, LP2, A1 and A2, as well as the values of the azimuth angles and the gap widths of the head gaps of the magnetic heads SP1, SP2, LP1, LP2, A1 and A2, appear in FIG. 10. With respect to the gap lengths of the head gaps, it is to be noted that the magnetic heads SP1 and SP2 each have a gap length of approximately 0.54 μm, the magnetic heads LP1 and LP2 each have a gap length of approximately 0.20 μm, and the magnetic heads A1 and A2 each have a gap length of approximately 0.20 μm.

In the video recorder 1 as shown in FIG. 10 a magnetic tape 2 is driven in the forward tape transport direction 3 with a tape speed v(N)=3.33 m/s in a Short-Play mode. In a Long-Play mode, which is not, or hardly, customary in practice, a magnetic tape 2 is driven in the forward tape transport direction 3 with half the tape speed v(N/2)=v(N)/ 2=1.66 m/s. In an extended Long-Play mode, a magnetic tape 2 is driven in the forward tape transport direction 3 with one-third of the tape speed v(N), i.e., v(N/3)=v(N)/3=1.11 m/s. These tape speeds are indicated in each of the FIGS. 11, 12 and 13.

Figure 11:
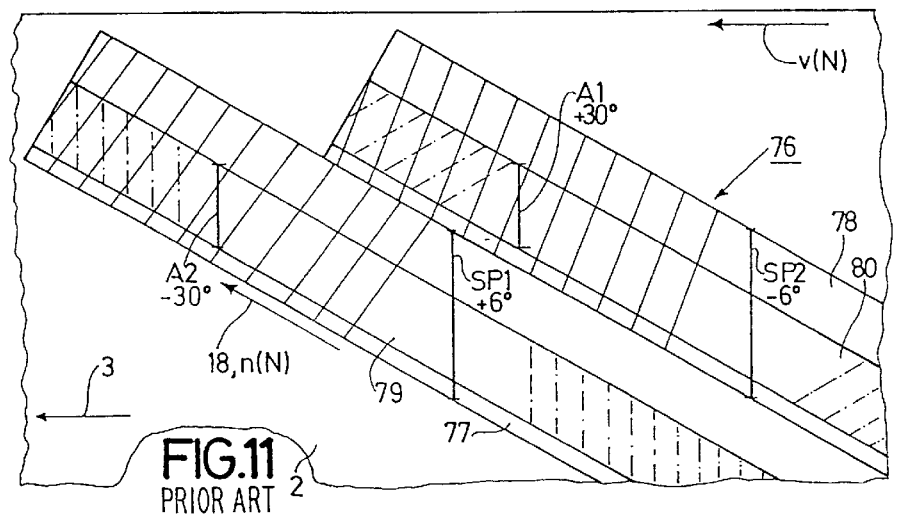
FIG. 11 shows a part of a track pattern already recorded on a magnetic tape in a Short-Play mode, for example, by means of a prior-art video recorder, having tracks containing analog NTSC video signals and analog audio signals, these tracks capable of being scanned by two head pairs having head gaps as shown in FIG. 10, in order to reproduce analog NTSC video signals and analog audio signals in a Short-Play mode.

FIG. 11 shows a part of a track pattern 76 comprising tracks 77, 78 and 79, 80. The tracks 77, 78, 79 and 80 of the track pattern 76 were recorded on the magnetic tape 2 in a Short-Play mode by a known video recorder in accordance with the VHS system for the recording and reproduction of analog NTSC video signals and associated audio signals, the magnetic tape having been driven with the tape speed v(N)=3.33 m/s, and the magnetic heads having been driven in the direction indicated by the arrow 18 with the speed of rotation n(N)=1800 r.p.m.

The tracks 77, 78, 79 and 80 of the track pattern 76 recorded on a magnetic tape 2 can be scanned by a video recorder 1 in accordance with the invention as shown in FIG. 10 in order to reproduce the NTSC video signals and analog audio signals recorded in these tracks when the magnetic tape 2 is driven with the tape speed v(N)=3.33 m/s, and the magnetic heads are driven in the direction indicated by the arrow 18 with the speed of rotation n(N) =1800 r.p.m., the tracks 77 and 78 then being scanned by the magnetic heads SP1 and SP2 of the video recorder 1 of FIG. 10, and the tracks 79 and 80 of the track pattern 76 being scanned by the magnetic heads A2 and A1 to reproduce the analog NTSC video signals and the frequency-modulated analog audio signals recorded in these tracks.

By means of the magnetic heads SP1 and SP2 of a video recorder 1 as shown in FIG. 10, it is also possible to record analog NTSC video signals on a magnetic tape 2 in tracks 77 and 78 in accordance with the track pattern 76. It is not possible to record analog audio signals by means of the magnetic heads A1 and A2 because the gap length of these two magnetic heads A1 and A2 has a value which is too small for the recording of analog audio signals. However, recording of analog audio signals is possible by means of the stationary magnetic head 9.

Figure 12:
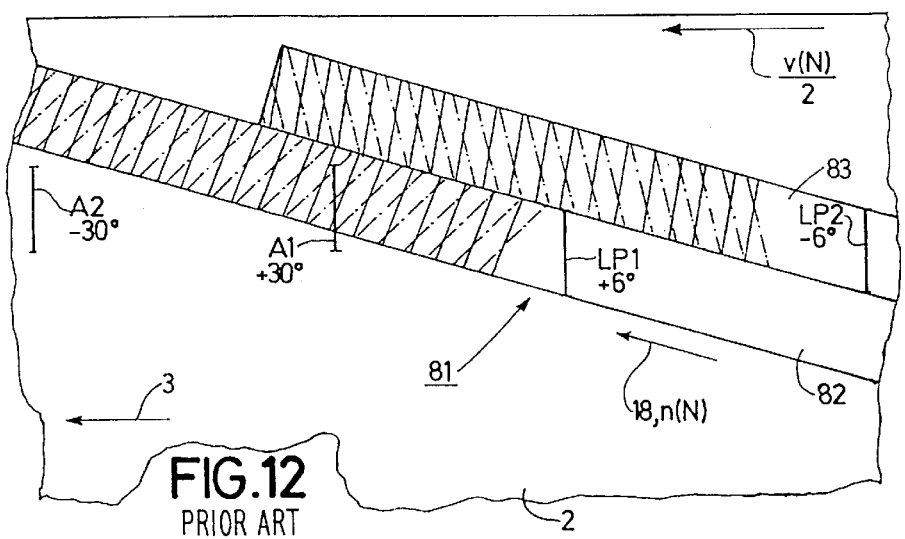
FIG. 12 shows a part of a track pattern recorded on a magnetic tape, for example, by means of a prior-art video recorder, having tracks containing analog NTSC video signals and analog audio signals, these tracks capable of being scanned by two head pairs having head gaps as shown in FIG. 10, in order to reproduce analog NTSC video signals and analog audio signals in a Long-Play mode.

FIG. 12 shows a part of a track pattern 81 comprising tracks 82 and 83. A track pattern 81, comprising tracks 82 and 83, can be recorded in a Long-Play mode by means of a known video recorder for recording and reproducing analog NTSC video signals and analog audio signals, the analog NTSC video signals being recorded in the tracks 82 and 83 as indicated by the solid-line hatching and, in addition, analog audio signals being recorded in the tracks 82 and 83 as indicated by the dash-dot hatching. Such a recording of analog audio signals in the Long-Play mode is not specified in the standard for VHS video recorders for NTSC signals and is not current practice.

The analog NTSC video signals recorded in the tracks 82 and 83 can be scanned and reproduced by means of the magnetic heads LP1 and LP2 of the video recorder 1 shown in FIG. 10. Likewise, it is possible to record analog NTSC video signals on a magnetic tape 2 in a Long-Play mode in accordance with the track pattern 81 by means of the magnetic heads LP1 and LP2 of the video recorder 1 shown in FIG. 10.

The analog audio signals stored in the tracks 82 and 83 can be reproduced by the magnetic heads A1 and A2 because the magnetic heads A1 and A2 almost completely cover the tracks 82 and 83 to be scanned by them.

Figure 13:
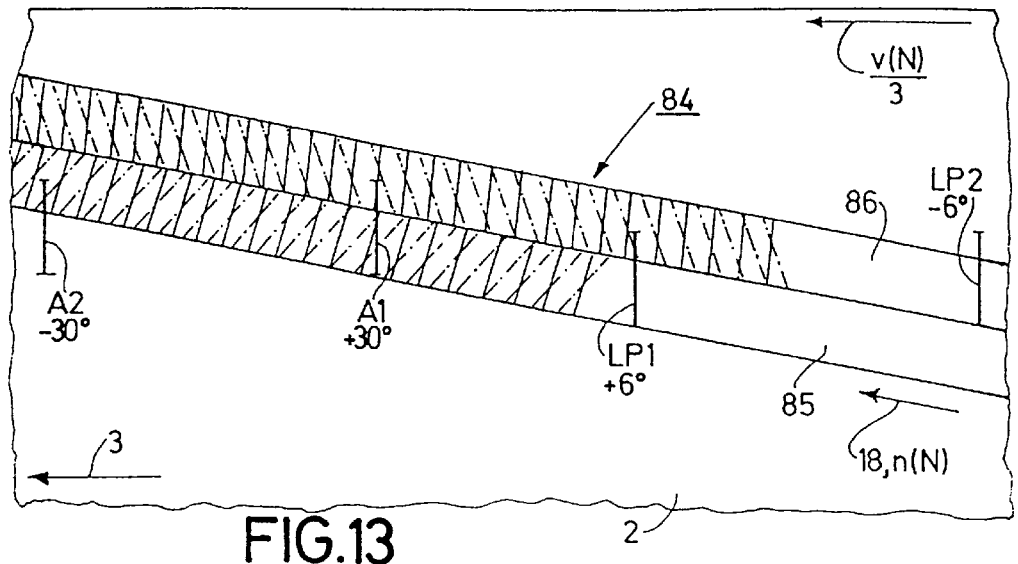
FIG. 13 shows a part of a track pattern recorded on a magnetic tape in an extended-Long-Play mode, for example, by means of a prior-art video recorder, having tracks containing analog NTSC video signals and analog audio signals, these tracks capable of being scanned by two head pairs having head gaps as shown in FIG. 10, in order to reproduce analog NTSC video signals and analog audio signals in an extended-Long-Play mode.

FIG. 13 shows a part of a track pattern 84 comprising tracks 85 and 86. The tracks 85 and 86 store analog NTSC video signals and analog audio signals recorded in an extended Long-Play mode by a known video recorder for the recording and reproduction of analog NTSC video signals and frequency-modulated analog audio signals. FIG. 13 diagrammatically shows the stored analog NTSC video signals as dash-dot hatchings.

When the head gaps of the magnetic heads LP1 and LP2 as well as A1 and A2 occupy the relative positions shown in FIG. 13 with respect to the tracks 85 and 86, it is possible to read and reproduce the analog NTSC video signals in the tracks 85 and 86 by the magnetic heads LP1 and LP2, and the analog audio signals in the tracks 85 and 86 by the magnetic heads A1 and A2, because both the magnetic heads LP1 and LP2 and the magnetic heads A1 and A2 provide an adequate coverage of the tracks to be scanned by them in order to obtain a satisfactory reproduction quality.

By means of the magnetic heads LP1 and LP2 of the video recorder 1 in accordance with the invention shown in FIG. 10, it is possible to record analog NTSC video signals in accordance with the track pattern 84 in an extended Long-Play mode. As already stated, it is not possible to record frequency-modulated analog audio signals by the magnetic heads A1 and A2 due to the small gap length of the head gaps of these magnetic heads. It is to be noted also that the head gaps of the magnetic heads LP1 and LP2 as well as A1 and A2 have an excess width in relation to the tracks 85 and 86.

Figure 14:
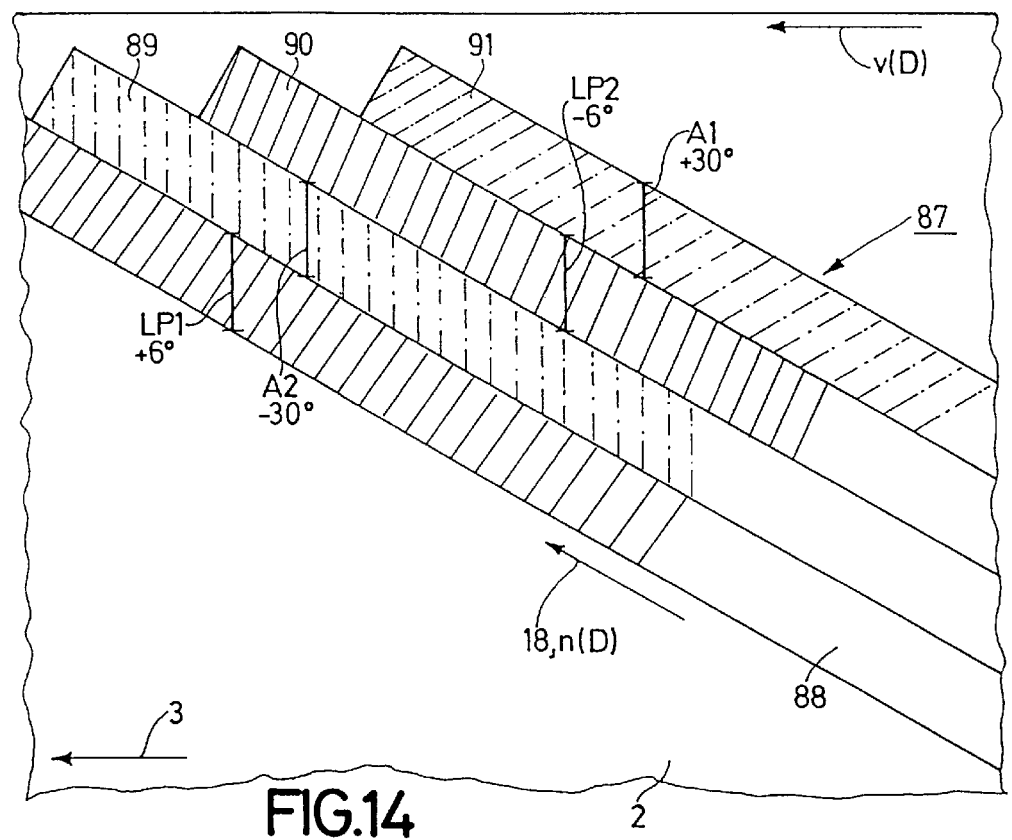
FIG. 14 shows a part of a track pattern on a magnetic tape having tracks capable of being scanned at a given tape speed by two head pairs having head gaps as shown in FIG. 10, in order to record and reproduce digital video signals and digital audio signals in a Short-Play mode.

FIG. 14 shows a part of a track pattern 87 comprising tracks 88, 89, 90 and 91. In the video recorder 1 in FIG. 10, in the same way as in the video recorder 1 in FIG. 4, the tracks 88, 89, 90 and 91 are also scanned by the magnetic heads LP1, A2, LP2 and A1 in one revolution of the rotationally drivable head support 15 when a magnetic tape 2 is driven in the forward tape transport direction with the tape speed v(D)=v(N)=3.33 m/s, and when the magnetic heads are driven in the direction indicated by the arrow 18 with the speed of rotation v(D)=n(N)=1800 r.p.m. During scanning of the tracks 88, 89, 90 and 91 by the magnetic heads LP1, A2, LP2 and A1, it is possible either to record or to reproduce digital video signals and digital audio signals.

The video recorder 1 shown in FIG. 10 also has the advantage that by means of the same magnetic heads, it is possible to transmit analog video signals and associated analog audio signals, and to record and reproduce digital video signals and associated digital audio signals.

Figure 15:
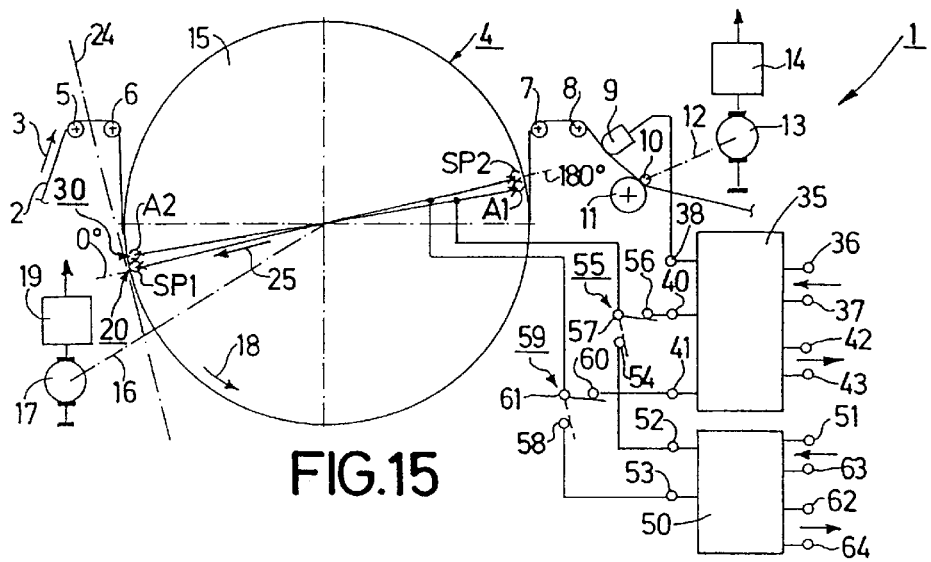
FIG. 15, in way similar to FIGS. 1 and 4, shows, diagrammatically, a part of a video recorder in accordance with a third embodiment of the invention, which is adapted to record and reproduce analog video signals in accordance with a PAL standard and analog audio signals, and to record and reproduce digital video signals and digital audio signals.

FIG. 15 shows a part of a video recorder 1 in accordance with a third exemplary embodiment of the invention. This video recorder 1 is constructed and is suited to record and reproduce analog PAL video signals and associated analog audio signals, and to record and reproduce digital video signals and associated digital audio signals. In a modification, such a video recorder can also be constructed so as to be suited to record and reproduce analog NTSC video signals and associated analog audio signals, and to record and reproduce digital video signals and associated digital audio signals.

Figure 16:
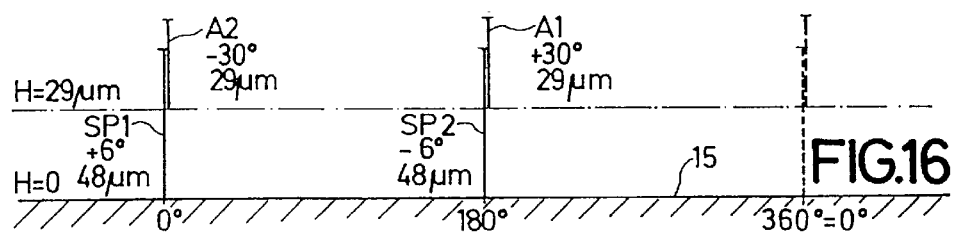
FIG. 16, in a way similar to FIGS. 2, 5 and 10, is a diagrammatically developed view showing the positions of the head gaps of magnetic heads on a head support of a drum-shaped scanning device of the video recorder shown in FIG. 15.

In the video recorder 1 shown in FIG. 15, the rotationally drivable head support 15 carries only two pairs 20 and 30 of magnetic heads SP1 and SP2 as well as A1 and A2. The angular positions and the height positions of the of the head gaps of the magnetic heads SP1, SP2 and A1, A2 appear in FIG. 16. FIG. 16 also gives the values of the azimuth angles and the gap widths of the head gaps of the magnetic heads SP1, SP2 and A1, A2. With respect to the gap lengths of the head gaps of the magnetic heads SP1, Sp2 and A1, A2, it is to be noted that the magnetic heads SP1 and SP2 each have a gap length of approximately 0.30 μm, and the magnetic heads A1 and A2 each have a gap length of approximately 0.30 μm. However, the gap lengths of the head gaps of the magnetic heads SP1, SP2, A1 and A2 may alternatively be approximately 0.25 μm, or approximately 0.20 μm.

Figure 17:
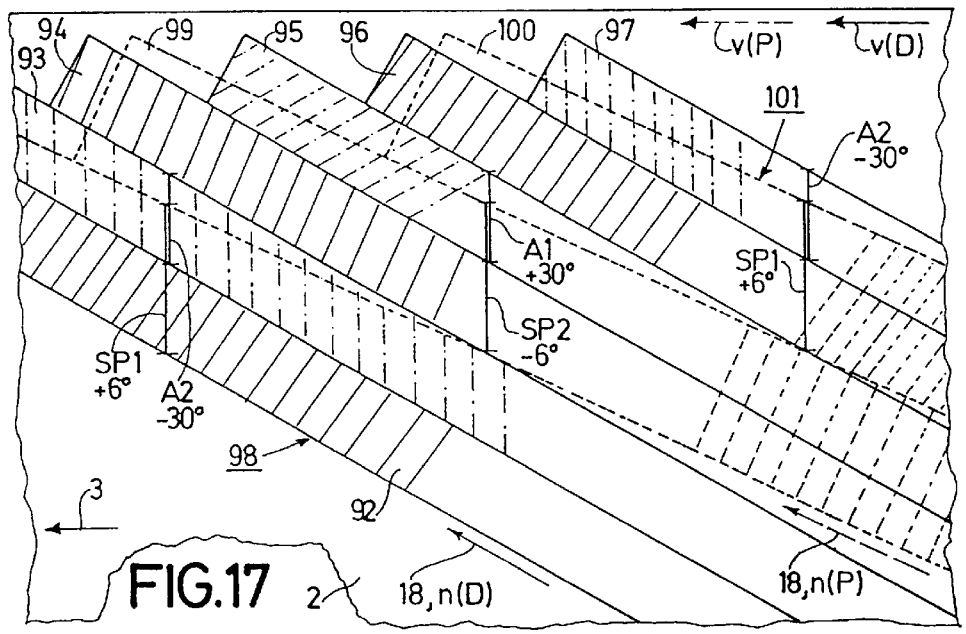
FIG. 17 shows, in broken lines, a part of a track pattern already recorded on a magnetic tape in a Short-Play mode, for example, by means of a video recorder as shown in FIG. 1, having tracks containing analog PAL video signals, these tracks capable of being scanned by one head pair of the video recorder shown in FIG. 15 in a Short-Play mode in order to reproduce analog PAL video signals, and, in solid lines, a part of a track pattern having tracks capable of being scanned at a given tape speed by two head pairs of the video recorder shown in FIG. 15, in order to record and reproduce digital video signals and digital audio signals in a Short-Play mode.

In the video recorder 1 shown in FIG. 15, the magnetic heads SP1 and SP2 of the one head pair 20 and the magnetic heads A1 and A2 of the further head pair 30 are arranged on the head support 15 in such a relationship to one another that the magnetic heads SP1 and SP2 of the one head pair 20 and the magnetic heads A1 and A2 of the further head pair 30 scan adjacent interleaved inclined tracks 92, 93, 94, 95, 96 and 97, as shown by the solid-line track pattern 98 in FIG. 17, when the magnetic tape 2 is driven with a given tape speed v(D)=v(N)=3.33 m/s, and the magnetic heads are driven with the speed of rotation n(D)=n(N)=1800 r.p.m. The tracks 92, 93, 94 and 95 can be scanned by the magnetic heads SP1, A2, SP2 and A1 during one full revolution of the rotationally drivable head support 15. During scanning of the track pattern 98, the magnetic heads SP1, A2, SP2 and A1 can record digital video signals and digital audio signals, or can reproduce digital video signals and digital audio signals, said magnetic heads SP1, A2, SP2 and A1 being connected to the two terminals 52 and 53 of the signal processing device 50 via the two switching devices 55 and 59. It is to be noted that in the video recorder 1 shown in FIG. 15, the change-over terminal 57 of the first switching device 55 is connected to the magnetic heads SP1 and SP2 via a rotary transformer, and not to the magnetic heads LP1 and LP2, as in the video recorder 1 shown in FIGS. 4 and 10. Moreover, it is to be noted that the head gaps of the magnetic heads SP1 and SP2 have an excess width in relation to the tracks 92, 94 and 96.

In the video recorder 1 shown in FIG. 15, a magnetic tape 2 can be driven in the forward tape transport direction 3 not only with the afore-mentioned tape speed v(D)=v(N)=3.33 m/s, but also with the tape speed v(P)=2.34 m/s. When a magnetic tape 2 is driven in the forward tape transport direction 3 with the tape speed v(P)=2.34 m/s, the magnetic heads SP2 and SP1 of the one head pair 20 can scan tracks 99 and 100 of a track pattern 101, which is shown in broken lines in FIG. 17. During scanning of the tracks 99 and 100, it is possible to record or to reproduce analog PAL video signals in a Short-Play mode.

When a magnetic tape 2, on which both analog PAL video signals and analog frequency-modulated audio signals have been stored by a known video recorder in accordance with the VHS standard for the recording and reproduction of analog video signals and analog audio signals in/from inclined tracks, is wrapped around the drum-shaped scanning device 4 of the video recorder 1 shown in FIG. 15, both the recorded analog PAL video signals and the recorded analog audio signals can be scanned and reproduced with the magnetic heads SP1, A2, SP2, A1 in a suitable relative position of the head gaps of the magnetic heads SP1, A2, SP2 and A1 with respect to the tracks, which relative position can be obtained by means of a tracking control device of the video recorder 1 in FIG. 15.

The video recorder 1 in FIG. 15 also has the advantage that by magnetic heads provided for the transmission of analog video signals and analog audio signals, it is also possible to record and reproduce digital video signals and digital audio signals, namely, in a particularly simple manner, in that the magnetic heads required for this purpose are arranged on a rotationally drivable head support in a given new relationship to one another and the head gaps of these magnetic heads have a suitable gap length for this.

Figure 18:
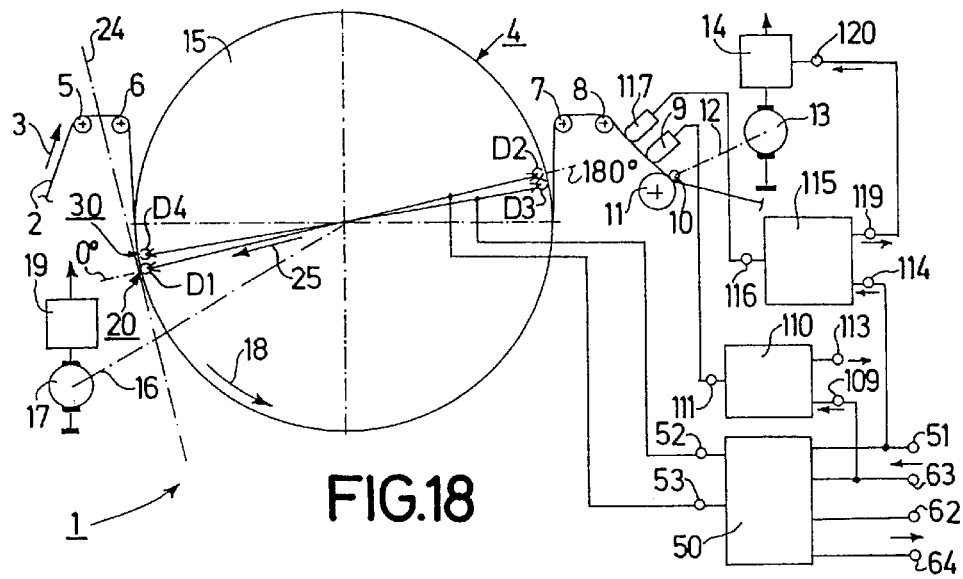
FIG. 18, in a way similar to FIGS. 1, 4 and 15, shows, diagrammatically, a part of a video recorder in accordance with a fourth embodiment of the invention, which is adapted to record and reproduce digital video signals and digital audio signals in inclined tracks.

FIG. 18 shows a part of a video recorder 1 in accordance with a fourth exemplary embodiment of the invention. This video recorder 1 is constructed and suitable for the recording and reproduction of digital video signals and associated digital audio signals in inclined tracks.

Figure 19:
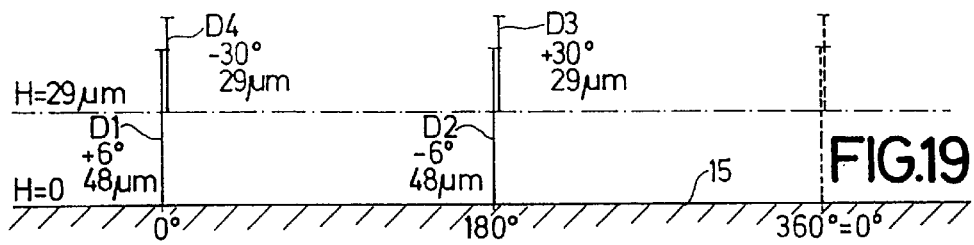
FIG. 19, in a way similar to FIGS. 2, 5, 10 and 16, is a diagrammatically developed view showing the positions of the head gaps of magnetic heads on a head support of a drum-shaped scanning device of the video recorder shown in FIG. 18.

In the video recorder 1 shown in FIG. 18, the rotationally drivable head support 15 also carries only two pairs 20 and 30 of magnetic heads D1, D2 and D3, D4. The angular positions and the height positions of the head gaps of the magnetic heads D1, D2 and D3, D4 are shown in FIG. 19. FIG. 19 also gives the values of the azimuth angles and the gap widths of the head gaps of the magnetic heads D1, D2 and D1, D2. With respect to the gap widths of the head gaps of the magnetic heads D1 and D2, it is to be noted that these gap width need not necessarily have a value of 48 $\mu$m, but may also have smaller values of approximately 40 $\mu$m, 35 $\mu$m or even 30 $\mu$m. With respect to the gap lengths of the head gaps of the magnetic heads D1 and D2 as well as D3 and D4, it is to be noted that the magnetic heads D1 and D2 may each have a gap length of approximately 0.30 $\mu$m, and likewise, the magnetic heads D3 and D4 may each have a gap length of approximately 30 $\mu$m. The gap lengths of the head gaps of the magnetic heads D1, D2, D3 and D4, however, may alternatively be approximately 0.25 $\mu$m, or approximately 0.20 $\mu$m.

In the video recorder 1 shown in FIG. 18, the magnetic heads D1 and D2 of the one head pair 20 and the magnetic heads D3 and D4 of the further head pair 30 are arranged on the head support 15 in such a relationship to one another that the magnetic heads D1 and D2 of the one head pair 20 and the magnetic heads D3 and D4 of the further head pair 30 scan adjacent interleaved inclined tracks 102, 103, 104, 105, 106 and 107, as shown by the track pattern 108 in FIG. 17, when the magnetic tape 2 is driven with a given tape speed, i.e., the tape speed v(D)=v(N)=3.33 m/s, and the magnetic heads are driven with the speed of rotation n(D)=n(N)=1800 r.p.m. The tracks 102, 103, 104 and 105 can be scanned by the magnetic heads D1, D2, D3 and D4 during one full revolution of the rotationally drivable head support 15. During scanning of the track pattern 108, the magnetic heads D1, D2, D3 and D4 can record digital video signals and digital audio signals, or can reproduce digital video signals and digital audio signals, said magnetic heads D1, D2, D3 and D4 in the present case not being connected to the two terminals 52 and 53 of the signal processing device 50 via the switching devices. It is to be noted that the head gaps of the magnetic heads D1 and D2 have an excess width in relation to the tracks 102, 104 and 106.

In the video recorder 1 shown in FIG. 18, the second input 63 of the signal processing device 50, to which input 63 analog audio signals can be applied, is connected to an input 109 of an audio signal processing device 110 for processing analog audio signals. At a terminal 111, the audio signal processing device 110 supplies analog audio signals, which are applied to the stationary magnetic head 9. The stationary magnetic head 9 records these analog audio signals in a longitudinal track 112 which extends in the longitudinal direction 3 of the tape, as is shown, diagrammatically, in FIG. 20. Analog audio signals reproduced by the stationary magnetic head 9 are applied to the terminal 111 of the audio signal processing device 110, after which the audio signal processing device 110 supplies the reproduced analog audio signals processed by this device to an output 113. The output 113 may be connected to the second output 64 of the signal processing device 50. The recording and reproduction of analog audio signals by the stationary magnetic head 9 may not be desirable for sound-dubbing purposes.

Figure 20:
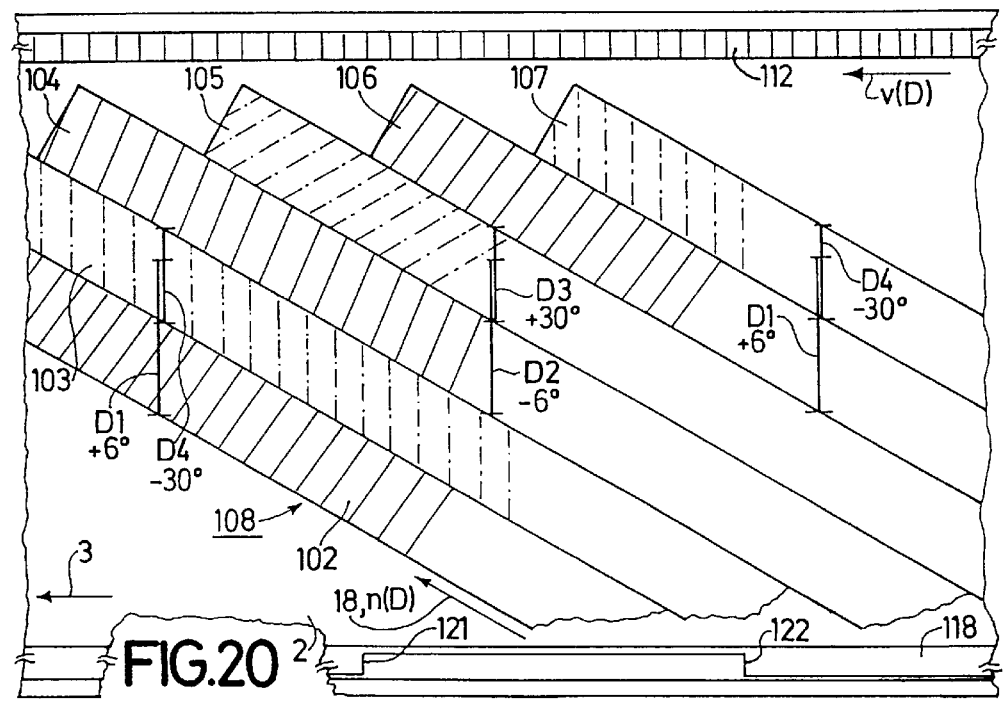
FIG. 20 shows a part of a track pattern on a magnetic tape having tracks capable of being scanned, at a given tape speed in order to record and reproduce digital video signals and digital audio signals in a Short-Play mode, by two head pairs of the video recorder shown in FIG. 18.

Moreover, the video recorder 1 shown in FIG. 18 has the first input 51 of the signal processing device 50, this input 51 being arranged to receive analog video signals, connected to an input 114 of a CTL signal processing device 115. The CTL signal processing device 115 comprises, as is known per se from existing video recorders, a sync separator stage, a microprocessor and an input/output stage. The sync separator stage extracts the synchronization signals, particularly, the vertical synchronization signals, from the video signal applied to the CTL signal processing device 115 and, by means of the extracted vertical synchronization signals, the microprocessor generates a CTL signal, which, in known manner, for example, in accordance with the VHS standard, may be formed by a squarewave signal and which is applied to a terminal 116 of the CTL signal processing device 115 via the input/output stage. The CTL signal is applied from the terminal 116 to a further stationary magnetic head 117, having a head gap arranged, in known manner, in line with the head gap of the stationary magnetic head 9, perpendicularly to the longitudinal direction 3 of the tape in the video recorder 1. For the sake of clarity of the drawing, this mutually aligned position of the head gaps of the two magnetic heads 9 and 117 is not shown in FIG. 18. By means of the stationary magnetic head 117, the CTL signal is recorded on a magnetic tape 2 in a further track 118 which extends in the longitudinal direction 3 of the tape, as is shown in FIG. 20. It is to be noted with respect to the CTL signal, that this signal is formed by a squarewave signal having one rising edge 121 and one falling edge 122 per revolution of the rotationally drivable head support 15 for the magnetic heads D1, D2, D3 and D4. A rising edge 121 may be recorded in the track 118, for example, so as to correspond to the beginning of an inclined track, for example, to the inclined track 102, and the subsequent falling edge 122 may be recorded in the track 118 so as to correspond to the next track plus one, i.e., the track 104. The next rising edge 121 is then recorded in the track 118 so as to correspond to the next inclined track plus two, i.e., the track 106.

A CTL signal reproduced by the stationary magnetic head 117 is applied to the terminal 116 of the CTL signal processing device 115 and, in the CTL signal processing device 115, it is first applied to the output/input stage and is subsequently processed further. After this, the processed CTL signal is available at an output 119 of the CTL signal processing device 115. From the output 119, a reproduced CTL signal is applied to an input 120 of the power supply 14, which, as already stated, includes a speed control device in which the CTL signal is used as phase information for the speed control of the motor 13 for driving the capstan 10.

The video recorder 1 shown in FIG. 18 also has the advantage that, by means which are known per se, digital video signals and digital audio signals can be recorded in and reproduced from inclined tracks in a particularly simple manner in that the magnetic heads required for this are arranged on a rotationally drivable head support in a given new relationship to one another, and the head gaps of these magnetic heads each have a gap length suitable for this purpose. A part of the video recorder 1 shown in FIG. 18 may be a part of an arrangement for manufacturing prerecorded magnetic tapes, i.e., an arrangement for recording video signals and audio signals in digital form on a magnetic tape in inclined tracks with a high recording quality.

The invention is not limited to the exemplary embodiments described above. There are a multitude of further possibilities for the mutual positions of the magnetic heads provided on a rotationally drivable head support of a drum-shaped scanning device of a video recorder for transmitting analog video signals and analog audio signals and for recording and reproducing digital video signals and digital audio signals. There are also further possibilities as regards the choice of the gap lengths of the head gaps of the magnetic heads provided for transmitting analog video signals and analog audio signals and for recording and reproducing digital video signals and digital audio signals; for example, alternatively the gap length may be only approximately 0.15 μm, but conversely it may also have a value of approximately 0.35 μm.

Furthermore, in the exemplary embodiment shown in FIG. 20, the sequence of the tracks is such that recurrently groups of tracks having azimuth angles of each time +30°, +6°, −30°, −6° are recorded. It is obvious that another sequence of the azimuth angles in the groups of tracks is possible, for example +30°, −6°, −30°, +6° or +6°, +30°, −6°, −30°.

It is to be noted also that in a variant of the invention, the recording apparatus in accordance with the invention may be configured to record information with a half bit rate. The speed of the record carrier is halved and two heads are used for recording the information with the halved bit rate. The two heads may be the two heads having the same absolute azimuth angle, i.e., either the heads with azimuth angles of +30° and −30°, or the heads with azimuth angles of +6° and −6°. The last-mentioned possibility is less interesting because the difference between the azimuth angles of this head pair is comparatively small (12°). It is also possible to use the two heads with azimuth angles of +30° and +6° or the two heads with azimuth angles of −30° and −6° for recording the information with the halved bit rate. The recording apparatus is then operated in an interval mode. The information is now recorded during half the time because the head pair with which the information is recorded is only in contact with the record carrier for half the time.

In addition, it is to be noted that the recording apparatus may be adapted to record information with a bit rate which is halved once more, i.e., with a quarter of the original bit rate, with a record carrier speed which is also halved once more.

In the above embodiment using two heads with the same absolute azimuth angle for recording the information with the halved bit rate, this can be achieved in that only one head is used for recording the information. This head then writes the information in tracks on the record carrier during half the time. This would also mean that tracks with the same azimuth angle would be recorded adjacent one another. This is undesirable. Therefore, a second head with another azimuth angle is arranged adjacent this head. These two heads are then used alternately to record the information.

In the above embodiment in which the recording apparatus is operated in an interval mode to record the information with the halved bit rate, this can be achieved in that the information is only recorded by means of the head pair during a quarter of the time, i.e., one time for every two revolutions of the head drum.

It will be evident that a reproducing apparatus identical to the described recording apparatus can be used to reproduce the information with the halved bit rate or with the bit rate halved once more.

What is claimed is:

1. An apparatus for recording and reproducing analog and digital video signals and analog and digital audio signals on and from a magnetic tape in adjacent tracks which are inclined relative to a longitudinal direction of the tape, said apparatus comprising:

a drum-shaped scanning device around which the magnetic tape travels at a given tape speed along a helical path during recording and reproduction, said drum-shaped scanning device comprising a rotationally drivable head support for carrying a plurality of magnetic heads, said head support carrying a first video head pair for conveying analog video signals at a normal tape speed, and a second video head pair for conveying analog video signals at a reduced tape speed, and an audio head pair for conveying analog audio signals at least at one of said tape speeds, said first video head pair comprising two diagonally arranged video magnetic heads having head gaps with oppositely oriented first video azimuth angles for scanning the magnetic tape along first adjacent inclined analog video tracks, said second video head pair comprising two diagonally arranged video magnetic heads having head gaps with oppositely oriented second video azimuth angles for scanning the magnetic tape along second adjacent inclined tracks, and said audio head pair comprising two diagonally arranged audio magnetic heads having head gaps with oppositely oriented audio azimuth angles for scanning the magnetic tape along adjacent inclined audio tracks, the first video azimuth angles of the two video magnetic heads of the first video head pair and the second video azimuth angles of the two video magnetic heads of the second video head pair being smaller than the audio azimuth angles of the two audio magnetic heads of the audio head pair, wherein the video magnetic heads of the second video head pair and the audio magnetic heads of the audio head pair are arranged on the head support in such a relationship to one another that at the given tape speed, the video magnetic heads of the second video head pair and the audio magnetic heads of the audio head pair additionally scan adjacent interleaved inclined digital tracks, in such a manner that an inclined digital track scanned by a magnetic head of one of the second video and audio head pairs is situated between two of the inclined digital tracks scanned by the magnetic heads of the other one of the second video and audio head pairs, and the head gaps of the magnetic heads of the second video head pair and of the audio head pair have gap lengths which are, at most, 0.40 $\mu$m; the apparatus further comprising:

an analog signal processing device for processing analog video signals and analog audio signals, said analog signal processing device being connected to the video magnetic heads of both said first and second video head pairs and to the audio magnetic heads during the conveying of analog video signals and analog audio signals; and a digital signal processing device for processing digital video signals and digital audio signals, said digital signal processing device being connected to the video magnetic heads of the second video head pair and to the audio magnetic heads of the audio head pair during the recording and reproduction of said digital video signals and said digital audio signals.

2. An apparatus as claimed in claim 1, characterized in that the video magnetic heads of the second video head pair and the audio magnetic heads of the audio head pair are arranged on the head support in such a relationship to one another that, at the given tape speed, a video magnetic head with a positive azimuth angle of the second video head pair scans a digital track which, viewed in the tape transport direction, follows a digital track scanned by an audio magnetic head with a positive azimuth angle of the audio head pair.

3. An apparatus as claimed in claim 1, characterized in that the gap lengths of the head gaps of the video magnetic heads of the second video head pair and the audio magnetic heads of the audio head pair are 0.30 $\mu$m, at most.

* * * * *